US011256559B2

(12) United States Patent
Yamada

(10) Patent No.: US 11,256,559 B2
(45) Date of Patent: Feb. 22, 2022

(54) ERROR DISPLAY SYSTEM, ERROR DISPLAY METHOD, AND INFORMATION PROCESSING APPARATUS

(71) Applicant: Tsuyoshi Yamada, Kanagawa (JP)

(72) Inventor: Tsuyoshi Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 16/689,328

(22) Filed: Nov. 20, 2019

(65) Prior Publication Data

US 2020/0174874 A1 Jun. 4, 2020

(30) Foreign Application Priority Data

Nov. 30, 2018 (JP) .............................. JP2018-224695

(51) Int. Cl.
*G06F 11/00* (2006.01)
*G06F 11/07* (2006.01)

(52) U.S. Cl.
CPC ...... *G06F 11/0772* (2013.01); *G06F 11/0709* (2013.01); *G06F 11/0751* (2013.01); *G06F 11/0778* (2013.01)

(58) Field of Classification Search
CPC .......................... G06F 11/0772; G06F 11/0709
See application file for complete search history.

(56) References Cited

U.S. PATENT DOCUMENTS

| | | | | |
|---|---|---|---|---|
| 2004/0250261 A1* | 12/2004 | Huibregtse | ............. | G06F 9/542 719/318 |
| 2009/0027432 A1 | 1/2009 | Watanabe et al. | | |
| 2010/0251106 A1 | 9/2010 | Barrus et al. | | |
| 2014/0281728 A1* | 9/2014 | Homma | ............... | G06F 11/2294 714/37 |
| 2015/0082222 A1 | 3/2015 | Yamada | | |
| 2016/0070557 A1 | 3/2016 | Yamada | | |
| 2016/0261769 A1 | 9/2016 | Yamada | | |
| 2017/0099570 A1 | 4/2017 | Yamada | | |
| 2018/0015755 A1 | 1/2018 | Yamada | | |
| 2018/0020120 A1 | 1/2018 | Yamada | | |
| 2018/0352407 A1 | 12/2018 | Yamada | | |
| 2019/0012614 A1 | 1/2019 | Yamada et al. | | |
| 2019/0281092 A1 | 9/2019 | Yamada et al. | | |
| 2019/0303827 A1 | 10/2019 | Hashimoto | | |

FOREIGN PATENT DOCUMENTS

| | | |
|---|---|---|
| JP | 2010-244541 | 10/2010 |
| JP | 2012-249856 | 12/2012 |

* cited by examiner

*Primary Examiner* — Philip Guyton
(74) *Attorney, Agent, or Firm* — IPUSA, PLLC

(57) ABSTRACT

A display system includes an information processing apparatus and an information processing terminal communicable with the information processing apparatus via a network. The information processing terminal is installed with an application that when executed by one or more first processors of the information processing terminal causes the one or more first processors to detect an error that has occurred at the information processing terminal, and notify the information processing apparatus of the detected error. The information processing apparatus includes one or more second processors configured to detect an error that has occurred at the information processing apparatus, and enable information relating to the error detected by the one or more second processors of the information processing apparatus and the error notified from the information processing terminal to be displayed on a first display.

17 Claims, 19 Drawing Sheets

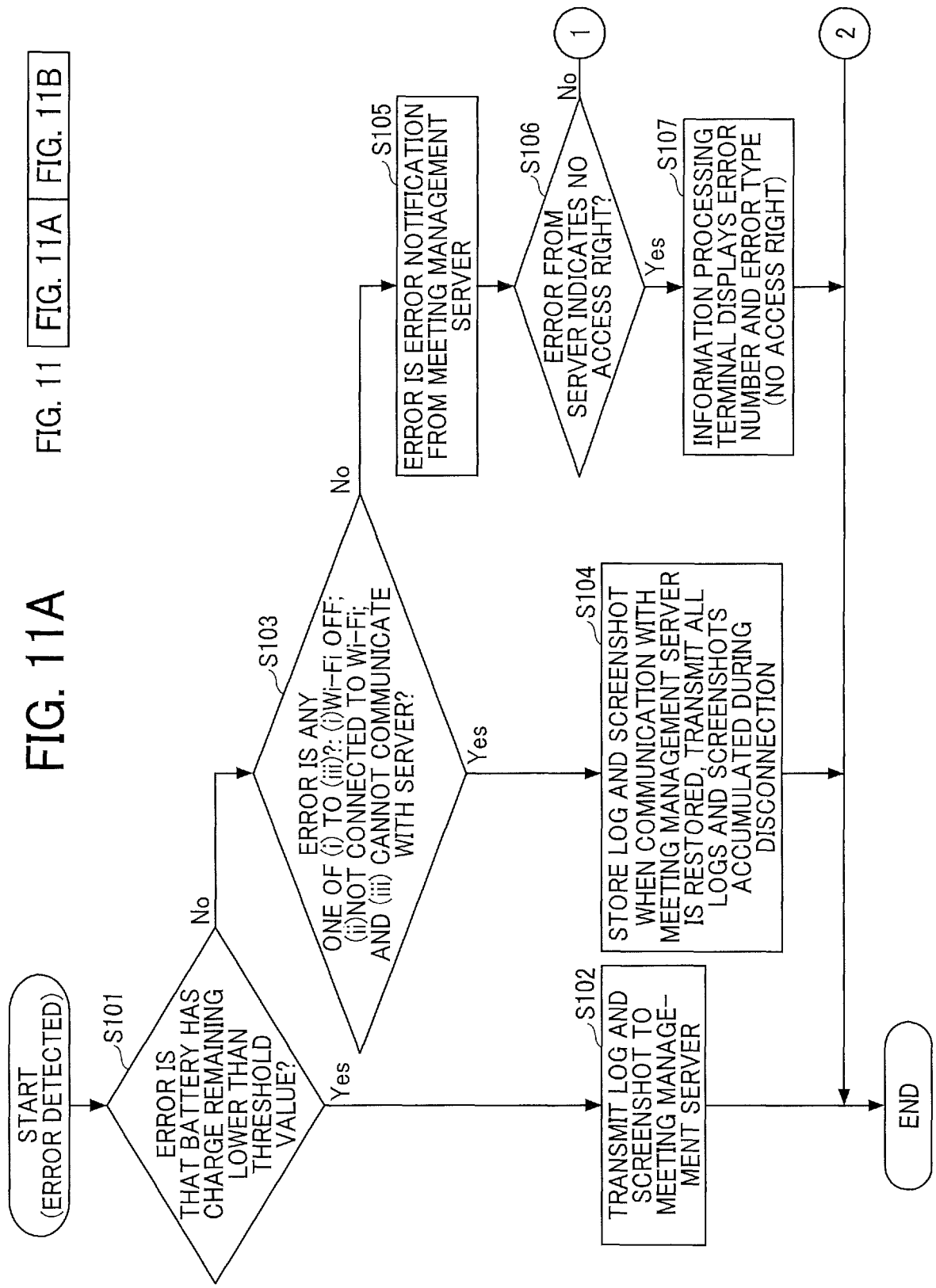

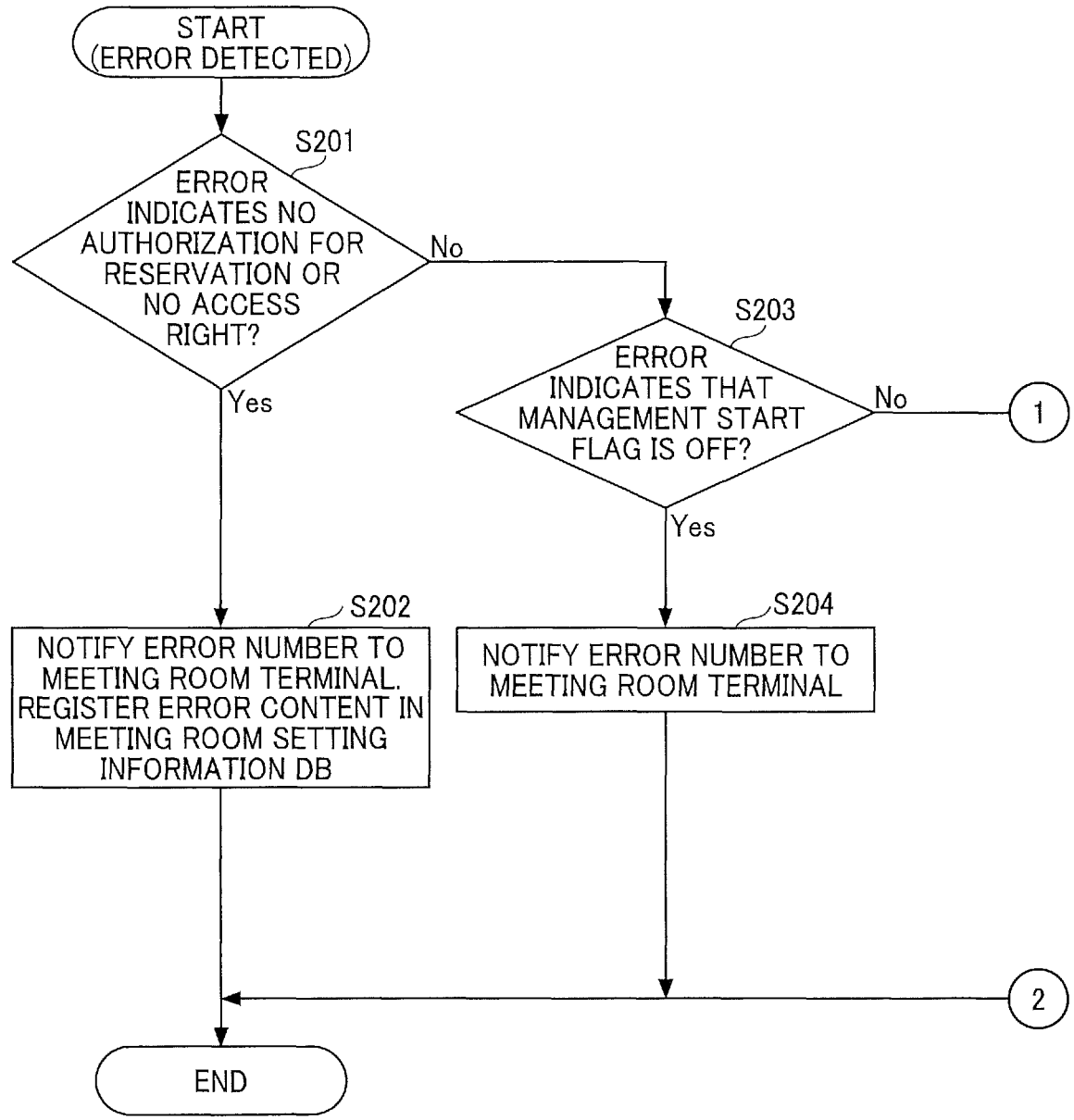

ERROR DISPLAY SYSTEM, ERROR DISPLAY METHOD, AND INFORMATION PROCESSING APPARATUS

CROSS-REFERENCE TO RELATED APPLICATION

This patent application is based on and claims priority pursuant to 35 U.S.C. § 119(a) to Japanese Patent Application No. 2018-224695, filed on Nov. 30, 2018, in the Japan Patent Office, the entire disclosure of which is hereby incorporated by reference herein.

BACKGROUND

Technical Field

The present disclosure relates to a system of displaying an error, a method of displaying an error, and an information processing apparatus.

Description of Related Art

When a failure occurs at an information processing terminal and therefore the information processing terminal cannot perform a desired function, a display message or an alarm sound indicating that a failure has occurred is output, in order to notify a user that a failure has occurred or to demand or prompt the user to fix the failure. Such failures are collectively called an "error". Notification of the error is called an "error output". When the user notices the error output, the user identifies the cause of the error and attempts to fix the error.

SUMMARY

A display system includes an information processing apparatus and an information processing terminal communicable with the information processing apparatus via a network. The information processing terminal is installed with an application that when executed by one or more first processors of the information processing terminal causes the one or more first processors to detect an error that has occurred at the information processing terminal, and notify the information processing apparatus of the detected error. The information processing apparatus includes one or more second processors configured to detect an error that has occurred at the information processing apparatus, and enable information relating to the error detected by the one or more second processors of the information processing apparatus and the error notified from the information processing terminal to be displayed on a first display.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 11A and FIG. 11B are flowcharts illustrating an example of an operation performed by the meeting room terminal of handling an error, according to an embodiment of the present disclosure;

FIG. 12A and FIG. 12B are flowcharts illustrating an example of an operation performed by the meeting management server of handling an error, according to an embodiment of the present disclosure;

Figure 1:
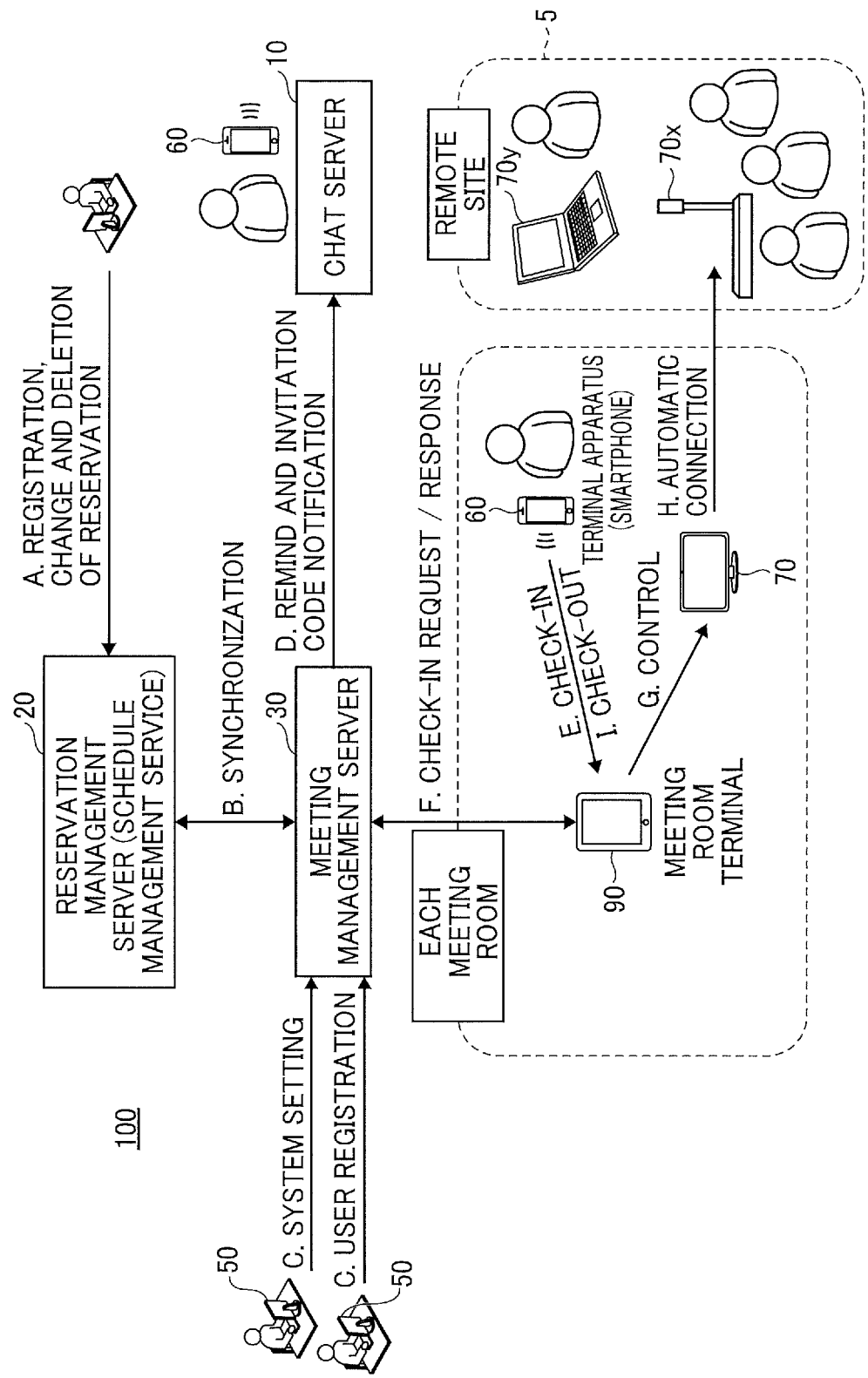
FIG. 1 is a diagram illustrating an overview of operation performed by a resource reservation system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of a resource reservation system and a control method performed by the resource reservation system, according to example embodiments of the present disclosure.

Hereinafter, a description is given of a resource reservation system and an error display method performed by the resource reservation system, according to example embodiments of the present disclosure.

Overview of Resource Reservation System:

First, a description is given of an overview of a reservation system with reference to FIG. 1. FIG. 1 is a diagram illustrating an overview of operation performed by a resource reservation system 100.

A. A user who is to make a reservation operates his or her terminal apparatus 60 to communicate with a reservation management server 20, whereby reserving a meeting room. The reservation management server 20 is implemented by a general-purpose cloud service such as Office365 (registered trademark) or G Suite (registered trademark). In the reservation management server 20, meeting rooms of an organization such as a company to which the user who makes the reservation belongs are registered.

B. A meeting management server 30 is a server that controls entire operation of the resource reservation system 100 based on the reservation status of the meeting rooms. The meeting management server 30 communicates with the reservation management server 20 at suitable timings to acquire reservation information, so that the reservation information is synchronized between the meeting management server 30 and the reservation management server 20.

C. An administrator or the like of the organization that uses the resource reservation system 100 operates a registration terminal 50 to perform user registration and configure various settings to the meeting management server 30. The user registration refers to registering an ID for identifying a user using the resource reservation system 100 or an e-mail address of the user in the meeting management server 30. For example, the user registration refers to registering a user to whom various notifications are to be sent by a chat server 10 such as Slack (registered trademark), Line (registered trademark), and Microsoft Teams (registered trademark). Further, since the notifications are sent by a bot that transmits a message as the meeting management server 30, the bot provided by the chat server 10 is also registered. The bot is a program for providing a user with an interface via which various notifications are sent or various inputs are received as a proxy of the resource reservation system 100 or the meeting management server 30 on each chat application (a terminal application of a chat system) in a terminal apparatus such as a smartphone of each user. In other words, the bot is a program on the chat server 10. As a virtual chat partner, the bot communicates with a user (a user of the resource reservation system 100) to send notifications, receive inputs, and send various guidance messages, and the like. For example, the bot acts as a system's contact that sends a reminder of reservation information to the user from the resource reservation system 100 and receives the user's inputs to the reminder such as participation or non-participation in a meeting as a chat. Examples of the various settings configured by the administrator or the like to the meeting management server 30 include registration of a meeting room terminal 90 and a setting of a timing when a reminder is to be sent.

D. When the current time is a predetermined time period before the start time of a meeting defined in the reservation information, the meeting management server 30 sends a reminder of the scheduled meeting to the user who made the reservation, thereby reducing an empty reservation of a meeting room. The "empty reservation" refers to reserving resources such as a meeting room that is not actually used. Further, the meeting management server 30 sends a notification indicating an invitation code (invitation to a group) to the user as needed. In response to receiving the reminder, the user who made the reservation stores information (meeting identification information) for checking in the meeting room in the terminal apparatus 60. The "check-in" or "checking in" refers to a user's input of an instruction for check-in for using the meeting room, and by the meeting management server 30, receiving information indicating the check-in in response to the check-in instruction to perform a process of setting a flag indicating the start of use of the meeting room.

E. The meeting room terminal 90 is located in each of one or more meeting rooms 6. The meeting room terminal 90 downloads, at preset intervals, reservation information for meetings to be held in the meeting room where the meeting room terminal 90 is located. The meeting room terminal 90 displays the schedule of meetings to be held on the current day or the schedule of the most recent meeting, thereby allowing participants of the meeting to confirm the schedule. The user who made the reservation for the meeting room enters the meeting room 6 a little before the start time of the meeting to check in. For example, the user inputs the meeting identification information to the meeting room terminal 90 or the user holds the terminal apparatus 60 over the meeting room terminal 90 (e.g., brings the terminal apparatus 60 near the meeting room terminal 90), thereby causing the meeting room terminal 90 to read the terminal identification information or to perform communication. Further, for example, the user presses a check-in button (use start button) displayed by a terminal application 90a of the meeting room terminal 90.

F. The meeting room terminal 90 transmits a check-in request to the meeting management server 30. If the meeting room terminal 90 is authenticated with the meeting identification information, the meeting room terminal 90 receives a response indicating that the check-in has succeeded from the meeting management server 30. The meeting room terminal 90 displays that the meeting room is in use (in session). In a case where the meeting management server 30 does not confirm a use start notification indicating the check-in by a preset time before or after the start time of the meeting, the meeting management server 30 cancels the reservation of the meeting room 6. In other words, the meeting management server 30 cancels the reservation information when the use of the meeting room is not started for a preset time period. Further, the meeting management server 30 transmits, to the meeting room terminal 90, information indicating the reservation is canceled as a status included in the reservation information. In this case, since the meeting room terminal 90 displays information indicating that the meeting room is vacant, any user can use the meeting room 6.

G. The meeting room terminal 90 controls an electronic device 70 in response to a request from the meeting management server 30. For example, the meeting room terminal 90 controls the electronic device 70 so that the power is turned on at the start time of the meeting and turned off at the end time of the meeting, thereby improving convenience when the meeting participant operates the electronic device 70.

H. When the electronic device 70 has, for example, a videoconferencing function, the electronic device 70 is configured to communicate with an electronic device such as a videoconferencing terminal 70x at a remote site 4 to conduct a meeting (videoconference). Note that a personal computer (PC) 70y on which an application operates can also communicate with the electronic device 70. The reservation information includes destination information (communication ID of a communication destination) indicating the remote site 4 in advance. The electronic device 70 can automatically communicate with the videoconferencing terminal 70x and the PC 70y by using the destination information.

I. When the user who made the reservation ends the meeting, the user presses a button of the meeting room terminal 90 to check out. The meeting room terminal 90 displays the next reservation status, thereby allowing any user to check the reservation status of the meeting room.

Overview of Error Display:

According to a conventional error display method, if an error occurs just inside the meeting room terminal 90, an error type is identified by searching a database inside the meeting room terminal 90 and the identified error type is displayed. However, when the meeting room terminal 90 as a part of a system configuration communicates with the meeting management server 30, a cause of an error differs between the meeting management server 30 and the meeting room terminal 90. For this reason, a user of the service finds it difficult to identify the cause of the error, and it takes time to fix the error and restore normal operation to the service.

More specifically, the meeting room terminal 90 alone cannot express an error of the meeting management server 30. Further, the meeting management server 30 cannot monitor an error of the meeting room terminal 90. Furthermore, the meeting management server 30 cannot recognize what happened when the error occurred in the meeting room terminal 90. For these reasons, the administrator cannot recognize the status from a remote location. Further, when the type of error increases, the meeting room terminal 90 alone cannot handle the increase in error type. Due to these factors, the meeting management server 30 cannot recognize all the causes of errors or the identified causes of errors cannot be displayed on the meeting room terminal 90.

Figure 2:
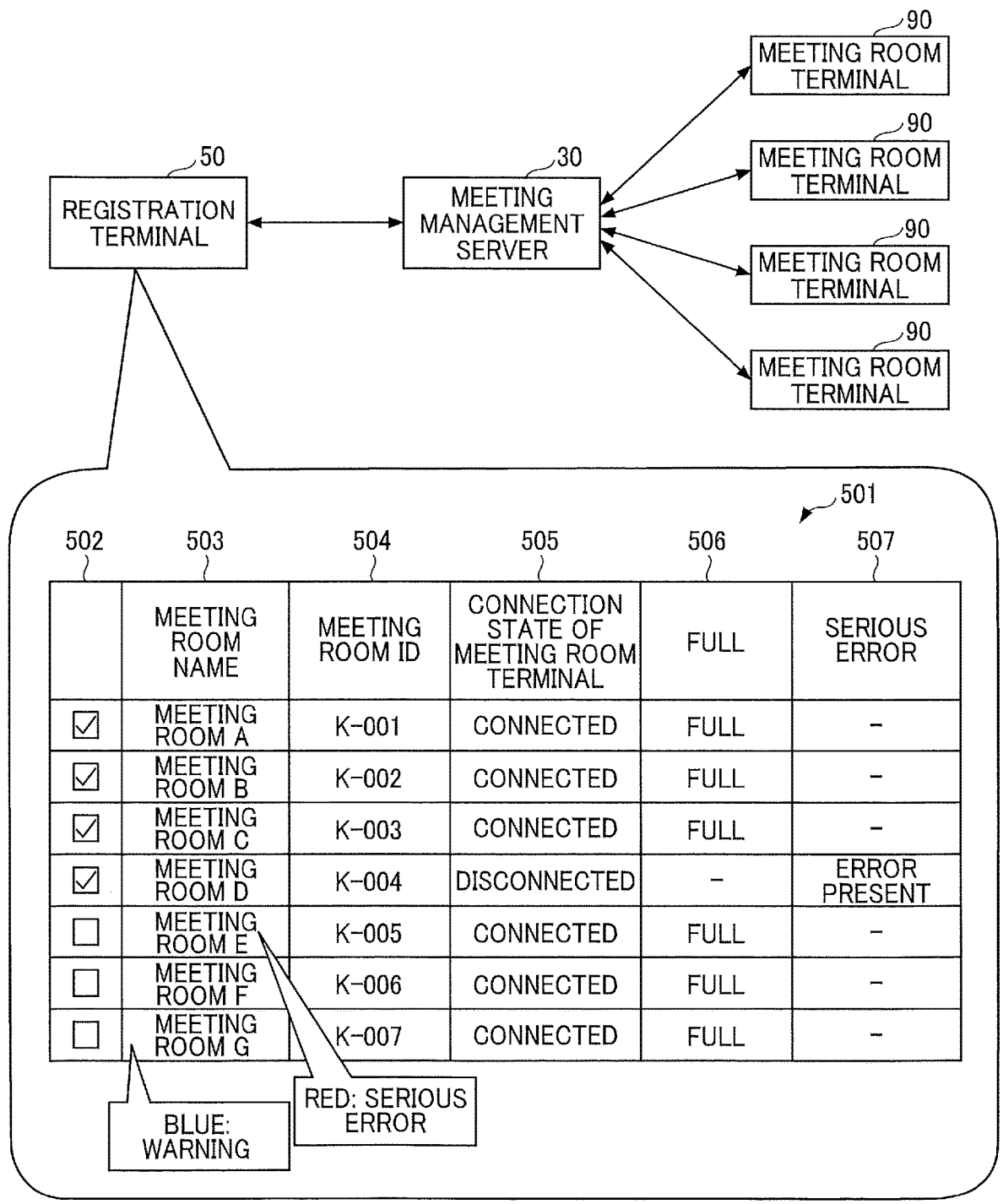
FIG. 2 is a diagram for explaining an example of an error list displayed by a registration terminal, according to an embodiment of the present disclosure.

A description is now given of how to display an error(s) by the resource reservation system 100 according to an embodiment, with reference to FIG. 2. FIG. 2 is a diagram for explaining an example of errors displayed by the registration terminal 50. The resource reservation system 100 of the present embodiment also has a function of an error display system.

As illustrated in FIG. 2, plural meeting room terminals 90 are connected to the meeting management server 30 via a network. The meeting room terminal 90 in normal operation communicates with the meeting management server 30 at preset intervals. Further, the meeting management server 30 provides screen information of a management screen 501 including information on each of the meeting room terminals 90 to the registration terminal 50. Based on the screen information, the registration terminal 50 displays a list of the meeting room terminals 90 on the management screen 501 viewed by the administrator. In the present embodiment, the management screen 501 on which the list is displayed is used to manage errors that have occurred in the meeting room terminals 90 and/or the meeting management server 30.

In a battery column 506 and a serious error column 507, an error regarding the meeting room terminal 90 is displayed. More specifically, when the battery charge remaining of the meeting room terminal 90 is lower than a threshold value, an error is displayed in the battery column 506. Further, for example, when the meeting management server 30 fails to communicate with the meeting room terminal 90, an error is displayed in the serious error column 507. Thus, the administrator can recognize in which meeting room terminal(s) 90 an error is occurring only by viewing the battery column 506 and the serious error column 507. In the example of FIG. 2, since the meeting management server 30 and the meeting room terminal 90 in a meeting room D cannot communicate with each other, "ERROR PRESENT" is registered in the serious error column 507 corresponding to the meeting room D.

Regarding an error of the meeting management server 30, a meeting room name in a meeting room name column 503 is displayed in a color corresponding to the seriousness of error. Examples of a failure detected by the meeting management server 30 include that the meeting management server 30 and the meeting room terminal 90 fail to communicate with each other, that the meeting management server 30 fails to access the reservation management server 20, and that there is no authorization for reservation to the reservation management server 20. From among these examples of failure, the failure that the meeting management server 30 and the meeting room terminal 90 fail to communicate with each other is displayed in the serious error column 507 as an error of the meeting room terminal 90. Regarding the other example of failure, when a particular meeting room name in the meeting room name column 503 is displayed in red, the red indicates a highly urgent error. When a particular meeting room name in the meeting room name column 503 is displayed in blue, the blue indicates a warning. Thus, the administrator can recognize what error is occurring in the meeting management server 30 in which an error has occurred only by viewing the meeting room names in the meeting room name column 503.

In the example of FIG. 2, since the meeting management server 30 fails to access the reservation management server 20 regarding the reservation information of a meeting room E, the meeting room name of the meeting room E is displayed in red, for example. Further, since there is no authorization for reservation to the reservation management server 20 regarding a meeting room G, the meeting room name of the meeting room G is displayed in blue, which means a warning.

As described, since the resource reservation system 100 of the present embodiment can display a list of the errors detected at the meeting room terminal 90 and the meeting management server 30, the administrator can identify at an early stage a particular meeting room terminal 90 in which an error is occurring. Conventionally, the administrator needs to visit the meeting rooms one by one to find out a particular meeting room terminal 90 in which an error is occurring. Further, even when an error is occurring in the meeting management server 30, the administrator is able to identify at an early stage which meeting room is a target of the error occurring in the meeting management server 30.

Terms Used in the Disclosure

The term "error" refers to that in the resource reservation system, due to failure such as at least one meeting room terminal 90 and the meeting management server 30 fail to cooperate with each other, a service use stops between the at least one meeting room terminal 90 and the meeting management server 30.

The term "resource" refers to a resource such as a meeting room, and equipment, device, person (receptionist), mechanisms, etc. that can be used in the meeting room. From among the resources, a resource that is difficult to move is referred to as a "facility". In the present embodiment, for the sake of explanatory convenience, the term "meeting room" is used as an example of the resource.

Information relating to an error can be any information based on which at least a person concerned recognizes that an error has occurred. The user may recognize that an error has occurred. For example, the information relating to an error can include an error code indicating a content of the error or a specific error content.

Figure 3:
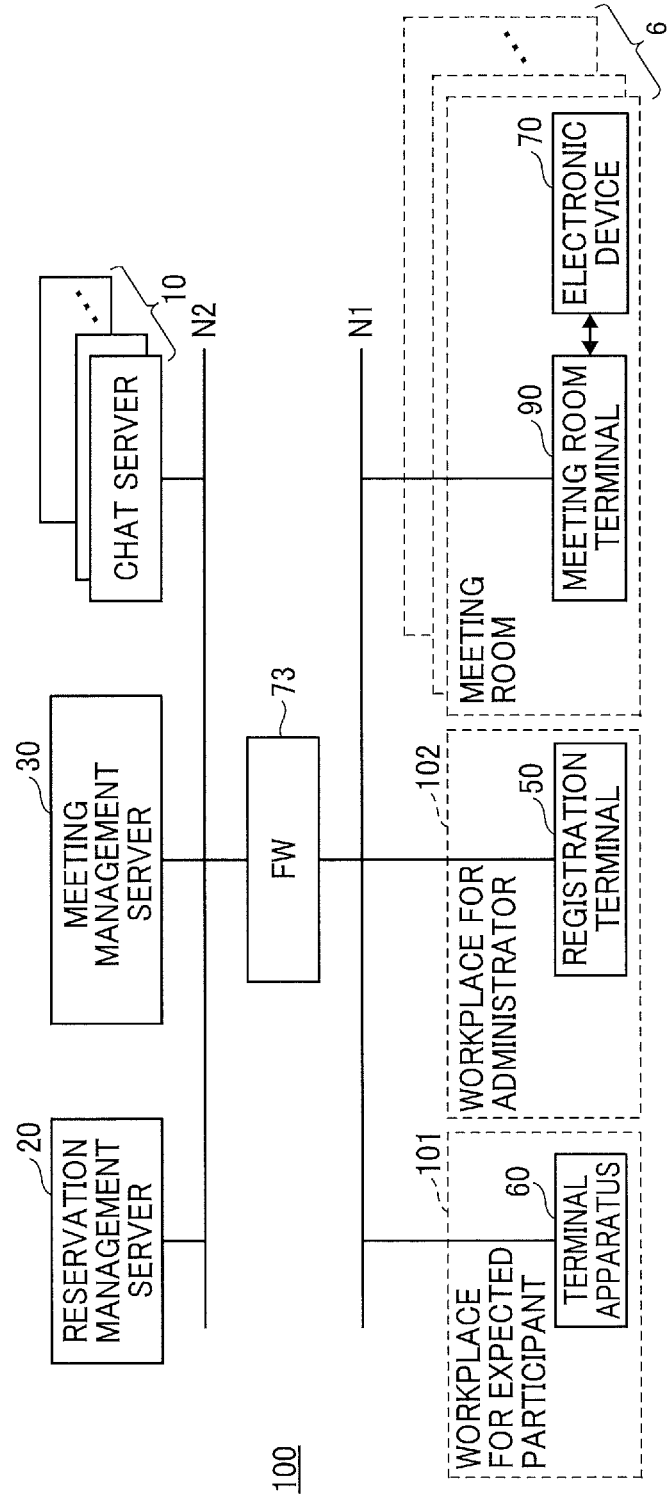
FIG. 3 is a schematic diagram illustrating an example of a system configuration of the resource reservation system, according to an embodiment of the present disclosure.

Example of System Configuration:

FIG. 3 is a schematic view illustrating an example of a system configuration of the resource reservation system 100. The resource reservation system 100 is mainly divided into an external network N2 and an intra-company network N1. The intra-company network N1 refers to a network inside a firewall 73. The external network N2 is a network such as the Internet, through which an unspecified number of communications are transmitted.

The reservation management server 20, the meeting management server 30, and one or more chat servers 10 are connected to the external network N2. The servers communicate with one another as needed. Further, the terminal apparatus 60 operated by a participant attending a meeting can be connected to the external network N2 as needed.

The reservation management server 20 is implemented by one or more information processing apparatuses (a computer system), each being installed with a general-purpose server operating system (OS) or the like. A system relating to the reservation for a resource, which system is provided by the reservation management server 20, is referred to as a reservation management system. The reservation management server 20 has a calendar system and provides a web application for managing various schedules. Specifically, the web application provides the following functions, for example.

To receive schedule registration, and enable a user who made a reservation to confirm the registered schedule arbitrarily;

To send a reminder e-mail at the preset date and time, such as 30 minutes before the scheduled time;

To enable one person to manage schedules using plural calendars (for business, for private, etc.)

To share a calendar with users belonging to the same group

The reservation management server 20 manages a user using an account. The account refers to a right for a user to use a service. In many systems, the user logs in to a system using the account. For this reason, the account has a function (function of identification information) to enable the system to uniquely identify the user. In the present embodiment, the reservation management server 20 transmits reservation information of the account (domain) registered in advance to the meeting management server 30. Alternatively, the meeting management server 30 requests the reservation information by specifying the account of the reservation management server 20, to acquire the reservation information of the meeting room 6 from the reservation management server 20. The account can be any suitable information based on which a user can be uniquely identified. Examples of the account include an e-mail address, an ID, and a telephone number.

Although in the present embodiment, the reservation management server 20 manages the reservation of each meeting room 6 as a schedule, the reservation management server 20 is configured to manage various types of schedules in addition to the reservation of each meeting room 6. The reservation management server 20 can be used for reservations for various types of resources other than each meeting room 6, such as a reservation for rental of various electronic devices, a reservation for a parking lot, a rental office, a rental studio, a rental bicycle, a rental car, accommodation facilities such as hotels, a rental space such as event venues and lockers.

Although G Suite (registered trademark), Office 365 (registered trademark), and the like are known as the reservation management server 20 or the reservation management system including the reservation management server, any other suitable reservation management system having functions described in the present embodiment will suffice.

Further, in the present embodiment, information relating to the one or more meeting rooms 6 within the intra-company network N1 is registered in advance in the reservation management server 20. In other words, the web application of the reservation management server 20 is customized according to a meeting room name, a meeting room ID, a reservation available time, a capacity, a unit of reservation and the like of each meeting room 6 residing within the intra-company network N1 of a company using the resource reservation system 100. Accordingly, each meeting room 6 of the company using the resource reservation system 100 is associated with the reservation information.

The chat server 10 is implemented by one or more information processing apparatuses (computer system), each being installed with a general-purpose server OS or the like. A system for real-time sharing of information such as text, audio and video by a plurality of users provided by the chat server 10 is referred to as a chat system. The chat server 10 notifies the terminal apparatus 60 of the information about the reservation of the meeting room 6. In the present embodiment, the resource reservation system 100 can include a plurality of chat servers 10 operated by different entities respectively.

The information shared in the chat system includes image data, audio data, etc., in addition to text. In the present embodiment, a description is given of an example case in which text is mainly used for the notification, for the sake of explanatory convenience. For example, the chat system can provide a voice chat capability for the group. The voice chat can be a one-to-one voice chat or a one-to-N voice chat, where N≥2. In other words, according to the present embodiment, the chat system notifies the information about the reservation of the meeting room 6 by outputting a voice message, in addition to or in alterative to, displaying text. LINE (registered trademark), Slack (registered trademark), Microsoft Teams (registered trademark) and the like are known as chat systems, but any chat system having a capability of transmitting notification to one or a plurality of users from a bot (a program that executes predetermined processes) will suffice.

The chat server 10 also manages a user by using an account, which is different from the account of the reservation management server 20. The meeting management server 30 basically does not need to recognize the account of the chat server 10. However, the meeting management server 30 can transmit a notification by specifying a desired account of the chat server 10.

The meeting management server 30 is implemented by one or more information processing apparatuses (computer system), each being installed with a general-purpose server OS or the like. The meeting management server 30 is an example of an information processing apparatus in claims. As a process relating to the external network N2, the meeting management server 30 acquires the reservation information of the meeting room 6 from the reservation management server 20. Further, the meeting management server 30 acquires an expected participant set in the reservation information and transmits a notification to the group of the chat server 10 (or to an individual user such as a user who made the reservation) associated with the acquired expected participant at a preset time. As a process relating to the intra-company network N1, the meeting management server 30 manages a check-in and a check-out to and from the meeting room 6. Further, the meeting management server 30 controls turning on or off of the electronic device 70, based on the reservation information of the meeting room 6 acquired from the reservation management server 20.

There are the meeting room 6, a workplace 101 for an expected participant, a workplace 102 for an administrator, and the like in the intra-company network N1. An expected participant can access the external network N2 via the intra-company network N1 from various locations. Examples of the intra-company network N1 include a local area network (LAN). The meeting room 6, the workplace 101 for an expected participant, and the workplace 102 for an administrator are not necessarily in a LAN of the same company.

In the meeting room 6, the meeting room terminal 90 and the electronic device 70 are located. The meeting room terminal 90 and the electronic device 70 can communicate with each other via a small-scale LAN or a dedicated line. The electronic device 70 can connect to the intra-company network N1 and the external network N2 without intervening the meeting room terminal 90. The meeting room terminal 90 and the electronic device 70 can communicate with each other either wirelessly or by wire. Since the intra-company network N1 is inside the firewall 73, it is difficult to perform direct communication from the external network N2 to the intra-company network N1.

The meeting room terminal 90 is an information processing terminal operated by a meeting participant who uses the meeting room 6, such as the user who made the reservation for the meeting. For example, the meeting room terminal 90 is provided on a desk in the meeting room 6 or at an entrance of the meeting room 6. A plurality of the meeting room terminals 90 can be provided in one meeting room 6. The meeting room terminal 90 is implemented by one or more information processing apparatuses (computer system), each being installed with a general-purpose OS or the like.

For example, the meeting room terminal 90 transmits the meeting room ID to the meeting management server 30, to display the reservation information of the meeting room 6 of the current day. In addition, the meeting room terminal 90 periodically sends a request for reservation information to the meeting management server 30, to acquire reservation information in which any change is made. Furthermore, the meeting room terminal 90 acquires control information such as turning on or off of the electronic device 70 from the meeting management server 30. The meeting room terminal 90 turns on or off the electronic device 70 using the acquired control information.

The meeting room terminal 90 displays a standby screen for receiving an instruction for check-in, check-out, etc. Further, the meeting room terminal 90 communicates with the meeting management server 30, to notify the meeting management server 30 of the check-in or the check-out. In response to receiving the instruction for check-in, the meeting room terminal 90 transmits, to the meeting management server 30, meeting identification information that is input by the user who made the reservation and a meeting room ID that the meeting room terminal 90 holds in advance. Base on the meeting identification information and the meeting room ID transmitted from the meeting room terminal 90, the meeting management server 30 can confirm that the user who made the reservation for the meeting room 6 uses the reserved meeting room 6.

The electronic device 70 is office equipment of various types that can be used in the meeting room 6. Examples of the electronic device 70 include an electronic whiteboard, a multifunction peripheral, a projector, a digital signage, and a digital camera. The electronic whiteboard includes a large-sized display that supports a touch panel system. The electronic whiteboard detects coordinates of positions on a screen touched by such as a user's finger or a stylus, and connects the detected coordinates to display a stroke. In addition, the electronic whiteboard is configured to display an image in accordance with data output from a PC that is connected to the electronic whiteboard. Further, the electronic whiteboard is configured to communicate with other electronic whiteboard located in a remote site to share the displayed stroke in a synchronous manner. The electronic whiteboard can be referred to as an electronic information board.

The multifunction peripheral has multiple functions, such as a copier function, a scanner function, a printer function, and/or a facsimile transmitting/receiving function. The multifunction peripheral is used for printing or copying documents, scanning documents for conversion to digital data, and faxing documents during the meeting. The projector is a device that projects an image. For example, the projector projects an image (still image or moving image) displayed on a display of the terminal apparatus 60 onto a screen, etc., to enable the participants to share the image. The digital signage is a large-sized display, and is used for displaying any arbitrary still images or moving images. The digital camera is used by each participant to capture an image formed on paper documents or presentation materials displayed on the electronic whiteboard for storage.

The terminal apparatus 60 that is configured to connect to the intra-company network N1 is provided in the workplace 101 for an expected participant. The terminal apparatus 60 can perform communication by wire or wirelessly. The terminal apparatus 60 is an information processing apparatus used when an expected participant (including a user who makes a reservation) reserves a meeting room. The expected participant (including the user who makes a reservation) can also use the terminal apparatus 60 in the meeting room. In other words, the terminal apparatus 60 is an information processing apparatus carried by the expected participant.

The terminal apparatus 60 is implemented by one or more information processing apparatuses (computer system), each being installed with a general-purpose OS or the like. Examples of the terminal apparatus 60 include a smartphone, a tablet terminal, a PC, a personal digital assistant (PDA), a wearable PC such as smart glasses and a smartwatch. Further, the terminal apparatus 60 can be any suitable device, terminal or apparatus, provided that the device, terminal or apparatus has a communication capability and browser software or application software dedicated to the chat server 10 or the reservation management server 20 operates on the device, terminal or apparatus. For example, the terminal apparatus 60 can be a car navigation system, a game machine, a television receiver, and the like.

In the terminal apparatus 60, application software dedicated to the chat server 10 and application software dedicated to the resource reservation system 100 operate. The application software dedicated to the chat server 10 is referred to as a "chat application" hereinafter. The application software dedicated to the resource reservation system 100 is referred to as a "meeting application" hereinafter. Browser software can be substituted for either one or both of the chat application and the meeting application.

The registration terminal 50 that is configured to connect to the intra-company network N1 is provided in the workplace 102 for an administrator. The registration terminal 50 can perform communication by wire or wirelessly. The registration terminal 50 is a terminal, by using which an administrator configures various settings to the meeting management server 30.

The registration terminal 50 is implemented by the similar or substantially the similar information processing apparatus(es) that is constituted as the terminal apparatus 60. However, since the registration terminal 50 is used mainly by an administrator for configuring settings to the meeting management server 30, the chat application and the meeting application can be omitted from the registration terminal 50. The registration terminal 50 communicates with the meeting management server 30 mainly by browser software, and displays a web page. The registration terminal 50 functions as display means (a first display) of the meeting management server 30. Alternatively, the display means for displaying a screen provided by the meeting management server 30 can be display means directly connected to the meeting management server 30 or display means that the server apparatus itself includes.

Figure 4:
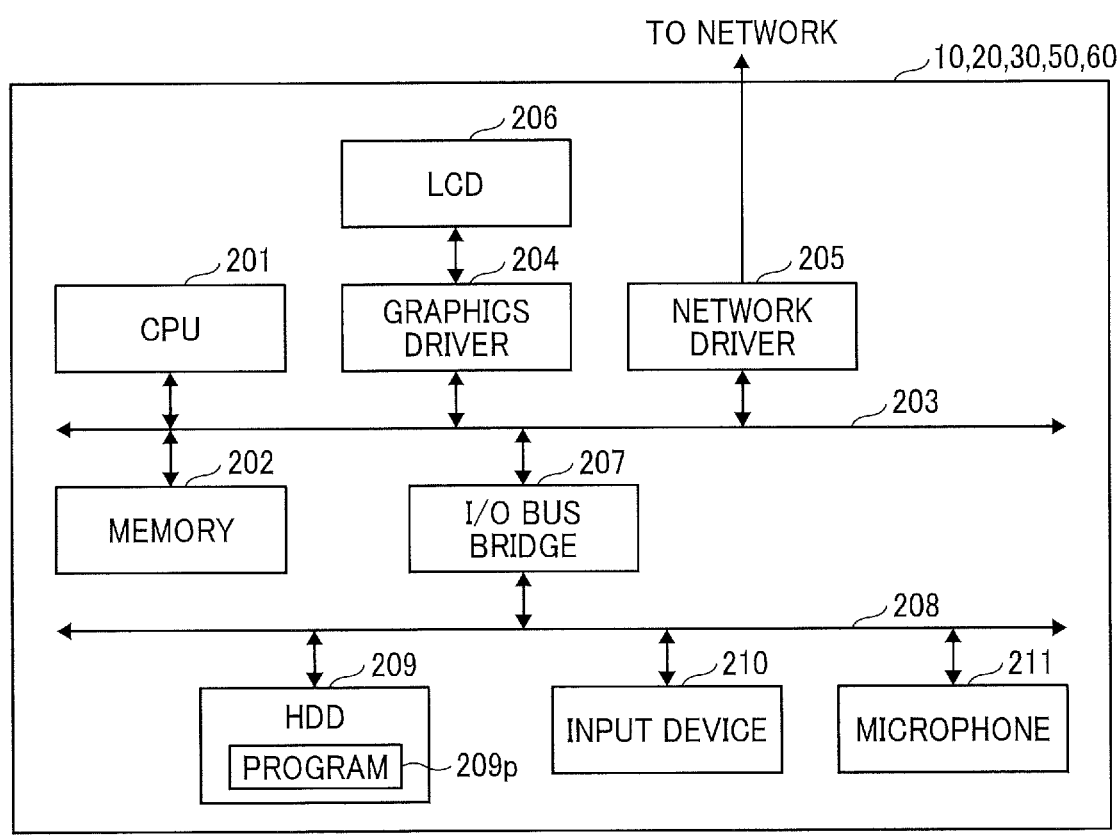
FIG. 4 is a block diagram illustrating an example of a hardware configuration of a meeting management server, according to an embodiment of the present disclosure.

Hardware Configuration:

Hardware Configuration of Meeting Management Server:

FIG. 4 is a block diagram illustrating an example of a hardware configuration of the meeting management server 30. The meeting management server 30 includes a central processing unit (CPU) 201 and a memory 202 that enables high-speed access to data by the CPU 201. The CPU 201 and the memory 202 are connected to other devices or drivers of the meeting management server 30, such as a graphics driver 204 and a network driver (NIC) 205, via a system bus 203.

The graphics driver 204 is connected to a liquid crystal display (LCD) 206 via a bus. The graphics driver 204 monitors a processing result by the CPU 201. The LCD 206 is an example of a display device/display. Further, the network driver 205 connects the meeting management server 30 to the external network N2 at a transport layer level and a physical layer level to establish a session with other devices or apparatuses.

An input/output (I/O) bus bridge 207 is further connected to the system bus 203. On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI) 80I, serial ATA, Small Computer System Interface (SCSI), Universal Serial Bus (USB), etc. The HDD 209 stores a program 209$p$ for controlling an overall operation of the meeting management server 30. A solid state drive (SSD) can be used in alternative to the HDD 209. The program 209$p$ can be distributed on a storage medium. Alternatively, the program 209$p$ can be distributed from a server for program distribution.

An input device 210, such as a keyboard and a mouse (called a pointing device), as well as a microphone 211, are connected to the I/O bus 208 via a bus such as a USB. The input device 210 and the microphone 211 accepts inputs or instructions by an operator such as a system administrator.

It should be noted that the illustrated hardware configuration of the meeting management server 30 indicates hardware elements preferably included in the meeting management server 30.

Each of the reservation management server 20, the chat server 10, the registration terminal 50, and the terminal apparatus 60 has the same or substantially the same hardware configuration as that of the meeting management server 30 illustrated in FIG. 4. Any of those servers, terminal, and apparatus can have a different hardware configuration as long as such differences cause no problem in describing the resource reservation system 100 of the present embodiment. In addition, the hardware configurations of the meeting management server 30, the reservation management server 20, and the chat server 10 of the present embodiment do not have to be static, since they support cloud computing. In other words, any of those servers can be configured as hardware resources that are dynamically connected/disconnected according to load. The "cloud computing" refers to internet-based computing where resources on a network are used or accessed without identifying specific hardware resources.

Figure 5:
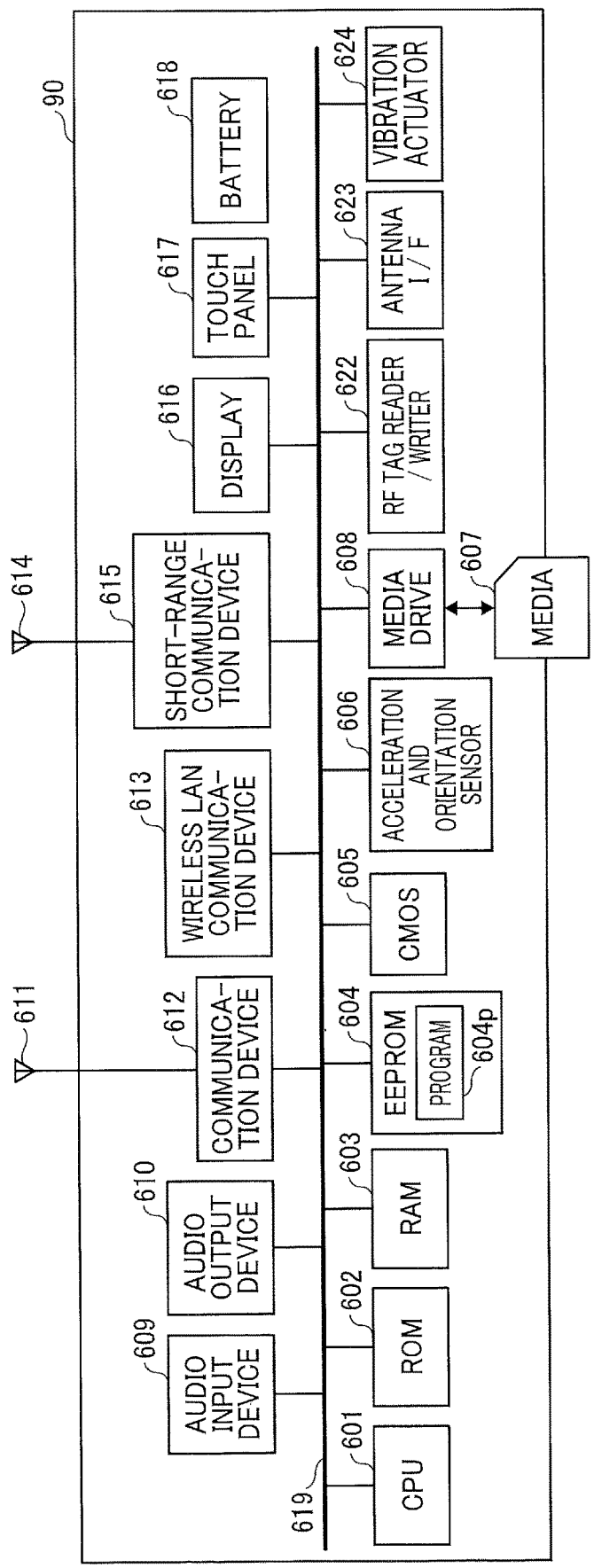
FIG. 5 is a block diagram illustrating an example of a hardware configuration of a meeting room terminal, according to an embodiment of the present disclosure.

Meeting Room Terminal:

FIG. 5 is a block diagram illustrating an example of a hardware configuration of the meeting room terminal 90. FIG. 5 illustrates a hardware configuration of a tablet apparatus, as an example of the meeting room terminal 90. The meeting room terminal 90 includes a CPU 601, a read only memory (ROM) 602, a random access memory (RAM) 603, an electrically erasable and programmable ROM (EEPROM) 604, a complementary metal oxide semiconductor (CMOS) sensor 605, an acceleration and orientation sensor 606, and a media drive 608.

The CPU 601 controls an overall operation of the meeting room terminal 90. The ROM 602 stores a basic input/output program. The RAM 603 is used as a work area for the CPU 601. The EEPROM 604 reads or writes data under control of the CPU 601. The CMOS sensor 605 captures an object under control of the CPU 601 to obtain image data. Examples of the acceleration and orientation sensor 606 includes an electromagnetic compass or gyrocompass for detecting geomagnetism, and an acceleration sensor.

The media drive 608 controls reading and writing (storing) of data from and to a medium 607 such as a flash memory. The medium 607 is removably mounted to the media drive 608. Accordingly, under control of the media drive 608, data recorded in the medium 607 is read from the medium 607 and new data is written (stored) into the medium 607.

The EEPROM 604 stores a program 604$p$ executed by the CPU 601. The program 604$p$ is application software or an OS for executing various processes of the embodiment. The program 604$p$ can be distributed on the medium 607.

Alternatively, the program 604p can be distributed from a server for program distribution.

The CMOS sensor 605 is a charge coupled device that converts an image of an object into electronic data through photoelectric conversion. In alternative to the CMOS sensor 605, a charge coupled device (CCD) may be used, provided that the CCD is capable of capturing the object. The CMOS sensor 605 is configured to read bar codes and two-dimensional barcodes.

Furthermore, the meeting room terminal 90 includes a radio-frequency (RF) tag reader/writer 622, an antenna interface (I/F) 623, and a vibration actuator 624. The RF tag reader/writer 622 performs communication in compliance a standard such as near-field communication (NFC).

The vibration actuator 624 is a motor configured to vibrate the meeting room terminal 90. For example, the vibration actuator 624 causes the meeting room terminal 90 to vibrate, to notify the participants that the end time of a meeting is approaching.

The meeting room terminal 90 further includes an audio input device 609, an audio output device 610, an antenna 611, a communication device 612, a wireless LAN communication device 613, an antenna 614 for a short-range wireless communication network, a short-range wireless communication device 615, a display 616, a touch panel 617, and a bus line 619.

The audio input device 609 converts sound into an audio signal. The audio output device 610 converts an audio signal into sound. The communication device 612 communicates with the nearest base station apparatus by using radio communication signals using the antenna 611. The wireless LAN communication device 613 performs wireless LAN communication conforming to the IEEE 802.11 standard, for example.

The short-range wireless communication device 615 is a communication device conforming to communication standards such as Bluetooth (registered trademark) or Bluetooth Low Energy (registered trademark). The short-range wireless communication device 615 performs communication using the antenna 614 for a short-range wireless communication network.

The display 616 displays an image of an object, various kinds of icons, etc. Examples of the display 616 include an LCD or an organic electroluminescence display. The touch panel 617 is disposed on the display 616. Examples of the touch panel 617 include a pressure-sensing panel and an electrostatic panel. The touch panel 617 detects a position on the display 616 touched by a finger, a stylus, and the like. The bus line 619 is an address bus or a data bus, which electrically connects the hardware elements described above of the meeting room terminal 90.

The meeting room terminal 90 further includes a battery 618 dedicated to the meeting room terminal 90. The meeting room terminal 90 can be driven by either the battery 618 or a commercial power supply. The audio input device 609 includes a microphone to collect sound. The audio output device 610 includes a speaker to output sound.

Figure 6:
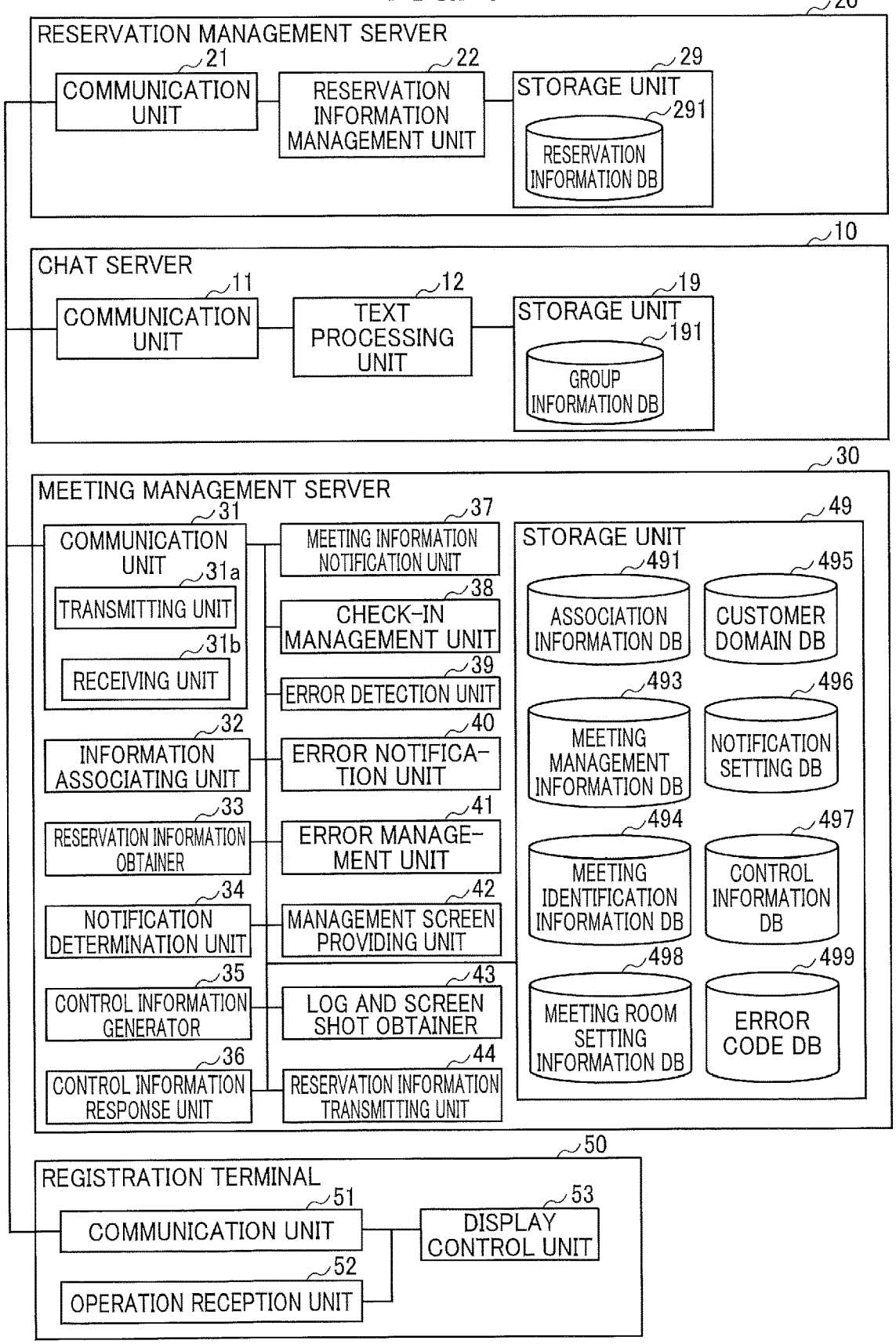
FIG. 6 is a block diagram illustrating functional configurations of a reservation management server, a chat server, the meeting management server, and the registration terminal, according to an embodiment of the present disclosure.

Functions:

FIG. 6 is a block diagram illustrating functional configurations of the reservation management server 20, the chat server 10, the meeting management server 30, and the registration terminal 50.

Reservation Management Server:

The reservation management server 20 includes a communication unit 21 and a reservation information management unit 22. These functional units of the reservation management server 20 are functions or means that are implemented by operating one or more hardware components illustrated in FIG. 4 in cooperation with instructions of the CPU 201 according to the program 209p loaded from the HDD 209 to the memory 202.

The communication unit 21 transmits and receives various types of information to and from the meeting management server 30 and the terminal apparatus 60. The communication unit 21 transmits screen information of a reservation setting screen to the terminal apparatus 60 and receives a reservation setting from the terminal apparatus 60. Further, the communication unit 21 transmits reservation information to the meeting management server 30.

The reservation information management unit 22 is a general-purpose web server (web application) that receives reservation information. The reservation information management unit 22 manages reservation information registered by a user. When reservation information is registered (or changed), the reservation information management unit 22 notifies the meeting management server 30 of an account of the user who made the reservation. Further, the reservation information management unit 22 transmits the reservation information to the meeting management server 30 via the communication unit 21, in response to a request specifying an account from the meeting management server 30. The reservation information management unit 22 may transmit, to the meeting management server 30, reservation information to which any change was made, even if there is no request from the meeting management server 30. A general-purpose web application can be used to enable a user who is to make a reservation to register a reservation for the meeting room 6 in the reservation management server 20.

The reservation management server 20 further includes a storage unit 29. The storage unit 29 is implemented by, for example, the memory 202 and the HDD 209 of FIG. 4. The storage unit 29 stores reservation information database (DB) 291.

TABLE 1

Reservation Information DB:

| Reservation ID | Account of reservation-making user | Meeting name | Meeting ID | Start time | End time | Accounts of expected participants |
|---|---|---|---|---|---|---|
| 001 | a@xfood.com | Product Z development meeting | K-001 | 2017 Jul. 7 10:00 | 2017 Jul. 7 12:00 | b@xfood.com c@xfood.com d@xfood.com |
| 002 | e@xfood.com | Product Y development meeting | K-001 | 2017 Jul. 7 13:00 | 2017 Jul. 7 14:00 | f@xfood.com g@xfood.com |
| ... | ... | ... | ... | ... | ... | ... |

Table 1 illustrates an example data structure of reservation information stored in the reservation information DB 291. The reservation information is information for managing a reservation state of the meeting room 6. The reservation information includes, for each of reservation IDs, an account of a reservation-making user, a meeting name, a meeting room ID, a start time of the meeting, an end time of the meeting, and accounts of expected participants in association with the reservation ID. The reservation ID is identification information for identifying one record of the reservation information. ID is an abbreviation for "identification," and means an identifier or identification information. ID is any one of a name, a symbol, a character string, a numerical value, or a combination of at least two of these items, which is used for identifying a particular object from among a plurality of objects. The same applies to other IDs than the reservation ID. The account of the reservation-making user is an account of an expected participant who made a reservation for the meeting room 6. The meeting name is a name of a meeting, which is given by the expected participant at his or her choice. The meeting room ID is identification information for identifying the meeting room 6 that resides on the intra-company network N1. The start time is the beginning of a time slot during which the meeting room 6 is reserved. In other words, the start time is a time when the meeting is to be started. The end time is the end of the time slot during which the meeting room 6 is reserved. In other words, the end time is a time when the meeting is to be ended. The accounts of expected participants are accounts of expected participants who are scheduled to attend the meeting. Each of the accounts in Table 1 is issued by the reservation management server 20.

Chat Server:

The chat server 10 includes a communication unit 11 and a text processing unit 12. These functional units of the chat server 10 are functions or means that are implemented by operating one or more hardware components illustrated in FIG. 4 in cooperation with instructions of the CPU 201 according to the program 209*p* loaded from the HDD 209 to the memory 202.

The communication unit 11 transmits and receives various types of information to and from the meeting management server 30. In the present embodiment, the communication unit 11 receives, from the meeting management server 30, information about reservation of a meeting room, information for identifying the bot, and information specifying a group as a destination to which a notification is to be sent. Examples of the information for identifying the bot include a token. This information for identifying the bot is notified in advance as identification information of the bot from the chat server 10, when generating the bot of the meeting management server 30. Further, the communication unit 11 may receive information specifying an account of an individual such as a user who made the reservation. Furthermore, the communication unit 11 transmits, to the meeting management server 30, information indicating that an expected participant has read the information about the reservation of the meeting room or a response made by an expected participant to the displayed information about the reservation of the meeting room.

Based on the information transmitted from the meeting management server 30, i.e., the information identifying the bot and the information specifying the group as a destination to which the notification is to be sent, the text processing unit 12 transmits, to the expected participants belonging to the group, information about the reservation of the meeting room 6 as information that the bot sends. In one example, the number of notifications transmitted by the text processing unit 12 is equal to the number of the expected participants. In another example, the notification is transmitted only to the user who made the reservation or only to user(s) registered as a notification destination.

The text processing unit 12 is configured to send a so-called "push notification". A known system provided by each OS is used for the push notification.

The chat server 10 further includes a storage unit 19. The storage unit 19 is implemented by, for example, the memory 202 and the HDD 209 of FIG. 4. The storage unit 19 stores group information DB 191.

TABLE 2

| | | Group Information DB: | | | | |
|---|---|---|---|---|---|---|
| Workspace | Channel | Member Account 1 | Member Account 2 | Member Account 3 | Member Account 4 | Bot account |
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| . . . | . . . | . . . | . . . | . . . | . . . | . . . |

Table 2 illustrates an example data structure of group information stored in the group information DB 191. The group information is information in which accounts of members belonging to the same group are registered. In the group information, member accounts 1 to n (n=4 in Table 2) and a bot account are registered in association with a workplace and a channel.

A workspace is identification information for identifying an organization such as a company or a department. In the present embodiment, plural members belong to a workspace (for example, Company A). Examples of the workspace include a uniform resource locator (URL). Alternatively, any suitable information other than the URL is used as the workspace, provided that the information is unique. Further, the workspace has plural channels according to the purposes of chatting. A channel is a group of members among whom information to be shared is exchanged, such as a group for Product A and a group for Product B. One or more members of the members belonging to the workspace belong to the channel. In other words, the notification destination is specified by the workspace and the channel. However, the notification destination is specified in different ways depending on what chat system is used for notification. Accordingly, if there is any identification information based on which a group is uniquely identified, such information can be used to specify the notification destination. In another example, three or more items of information can be used for specifying a group as the notification destination.

The channels are uniquely identified from one another. The member accounts 1 to n are accounts of members belonging to the channel. Each of these accounts is issued by the chat server 10. In the present embodiment, the bot is registered as a member for notifying other members belonging to the same group of information about the reservation of the meeting room 6. In other words, the bot is a kind of a proxy of the meeting management server 30 or a fictitious member. A comment (text) by the bot is transmitted to the terminal apparatus 60 of each of the member accounts 1 to n.

The workspace and channel are managed by the meeting management server 30. The workspace and channel are information for identifying the group to which the participant belongs.

Meeting Management Server:

The meeting management server 30 includes a communication unit 31, an information associating unit 32, a reservation information obtainer 33, a notification determination unit 34, a control information generator 35, a control information response unit 36, a meeting information notification unit 37, a check-in management unit 38, an error detection unit 39, an error notification unit 40, an error management unit 41, a management screen providing unit 42, a log and screenshot obtainer 43, and a reservation information transmitting unit 44. These functions of the meeting management server 30 are functions or means that are implemented by operating one or more hardware components illustrated in FIG. 4 in cooperation with instructions of the CPU 201 according to the program 209p loaded from the HDD 209 to the memory 202. The program 209p is distributed from a server for program distribution. Alternatively, the program 209p is distributed on a storage medium.

The communication unit 31 transmits and receives various kinds of information to and from the reservation management server 20, the chat server 10, the registration terminal 50, and the terminal apparatus 60. The communication unit 31 includes a transmitting unit 31a and a receiving unit 31b. The receiving unit 31b receives reservation information from the reservation management server 20 and receives a request for reservation information from the meeting room terminal 90. Further, the receiving unit 31b receives a check-in request from the meeting room terminal 90. Furthermore, the receiving unit 31b receives, from the registration terminal 50 operated by the administrator, information indicating an association between the group of the chat system and the account. The transmitting unit 31a transmits information relating to reservation of a meeting room to the chat server 10 and transmits the reservation information to the meeting room terminal 90.

The information associating unit 32 mainly performs processing relating to a preliminary registration process. Specifically, the information associating unit 32 receives a registration of a domain from the registration terminal 50 or the like operated by the administrator, and registers the domain in a customer domain DB 495. Further, the information associating unit 32 stores the workspace and the channel of the chat system transmitted from the registration terminal 50 or the like in association with the account of the reservation management server 20 in an association information. DB 491.

The reservation information obtainer 33 obtains the reservation information from the reservation management server 20 by specifying an account of a customer who uses the resource reservation system 100. The reservation information obtainer 33 registers the obtained reservation information as meeting management information in a meeting management information DB 493. For example, the reservation information obtainer 33 specifies an account of reservation information that is registered or updated notified from the reservation management server 20. Alternatively, the reservation information obtainer 33 specifies an arbitrary account. At least a part of the reservation information stored in the reservation management server 20 is stored in the meeting management information DB 493. More specifically, the reservation information obtainer 33 obtains the reservation information for a predetermined period in the future from the current time among the reservation information stored in the reservation management server 20. The predetermined period is determined depending on how long a period ahead is set to future meetings for which the information about the reservation of the meeting room 6 is to be notified.

The notification determination unit 34 determines whether the meeting management information includes a reservation whose start time satisfies a condition for notification. For example, the notification determination unit 34 refers to a notification settings DB 496 to determine whether the current time matches a date and time obtained by subtracting a preset period from the start time of the reservation. When the current time matches the obtained date and time by this subtraction, the notification determination unit 34 determines that a notification is to be sent. In another example, at the time when the reservation information obtainer 33 acquires the reservation information from the reservation management server 20, the notification determination unit 34 generates a task for notifying information relating to the reservation and registers the task in the queue. The task stored in the queue is executed when the execution time (the time at which a reminder is to be sent) arrives. For example, when there are plural bots according to different roles, such as a bot for sending a reminder and a bot for receiving a reservation, the notification determination unit 34 determines a suitable bot according to processing to be performed.

When the notification determination unit 34 determines that the notification is to be sent, the meeting information notification unit 37 specifies information identifying the bot (e.g., a token in Slack) and information identifying the group as the notification destination, to request the chat server 10 to transmit a notification of the information about the reservation of the meeting room 6. Note that the notification is performed several times, and the meeting identification information is included in at least one of the notifications. The meeting identification information is information based on which the meeting management server 30 confirms whether the participant has a right to use the reserved meeting room 6 during the reserved time slot. The meeting information notification unit 37 generates the meeting identification information by the final notification at the latest. The meeting identification information is registered in a meeting identification information DB 494.

The control information generator 35 refers to the meeting management information to generate control information for the electronic device 70, and registers the generated control information in a control information DB 497. For example, the control information generator 35 generates control information for turning on the power of the electronic device 70 several minutes before the start time of the meeting. Further, the control information generator 35 generates control information for turning off the power of the electronic device 70 in response to detection of the check-out. The control information is stored in the control information DB 497.

In response to receiving an inquiry from the meeting room terminal 90 provided in the meeting room 6 as to whether there is control information, the control information response unit 36 refers to the control information DB 497 to transmit the control information corresponding to the meeting room 6 to the meeting room terminal 90.

The check-in management unit 38 manages a check-in and a check-out to and from a meeting room. Further, the check-in management unit 38 registers, in the meeting management information DB 493, a status of a meeting, which status changes according to the check-in and the check-out. The check-in is allowed when it is 5 to 10 minutes before the start time of the meeting identified by the reservation ID. Further, the check-in is permitted when a pair of the meeting room ID and the meeting identification information transmitted from the meeting room terminal 90 is registered in the meeting identification information DB 494.

The error detection unit 39 detects an error occurring in the meeting management server 30. Errors to be detected by the error detection unit 39 are that the meeting management server 30 and the meeting room terminal 90 fail to communicate with each other, there is no access right, there is no authorization for reservation, and management has not started yet. A detailed description is given below of these errors. The error notification unit 40 notifies the meeting room terminal 90 of the error detected by the error detection unit 39 via the communication unit 31. The error management unit 41 manages error(s) notified from the meeting room terminals 90 and error(s) that has occurred at the meeting management server 30 in a meeting room setting information DB 498.

The management screen providing unit 42 generates screen information of the management screen 501 and transmits the generated screen information to the registration terminal 50 via the communication unit 31. The screen information is generated by Hyper Text Markup Language (HTML), Cascade Style Sheet (CSS), and JavaScript (registered trademark), for example. The management screen 501 is provided by JavaScript (registered trademark) as one screen of a web application that operates on a browser.

The log and screenshot obtainer 43 transmits a request for acquiring a log to the meeting room terminal 90. Further, the log and screenshot obtainer 43 transmits a request for acquiring a screenshot to the meeting room terminal 90. In a case where the firewall makes it difficult for the meeting management server 30 that resides on the cloud network to transmit the acquisition request to the meeting room terminal 90, the meeting management server 30 sets a flag indicating the acquisition request for a log or a screenshot in association with the meeting room ID in substantially the same manner as the control information. Since the meeting room terminal 90 periodically accesses the meeting management server 30, the meeting room terminal 90 acquires the flag at the timing when the meeting room terminal 90 accesses the meeting management server 30. Thus, the meeting room terminal 90 acquires a log or a screenshot.

The reservation information transmitting unit 44 transmits reservation information (meeting management information) stored in the meeting management information DB 493 in response to a request from the meeting room terminal 90. The reservation information transmitting unit 44 can transmit the reservation information (the meeting management information) in the JSON format, the XML format, the CVS (Comma-Separated Values) format, or the like. Since the reservation information is repeatedly transmitted, a format having a smaller data size is advantageous.

The meeting management server 30 further includes a storage unit 49. The storage unit 49 is implemented by, for example, the memory 202 and the HDD 209 of FIG. 4. The storage unit 49 stores the association information DB 491, the meeting management information DB 493, the meeting identification information DB 494, the customer domain DB 495, the notification settings DB 496, the control information DB 497, the meeting room setting information DB 498, and an error code DB 499.

TABLE 3

| Association Information DB: | | | | | |
|---|---|---|---|---|---|
| Workspace | Channel | Member Account 1 | Member Account 2 | Member Account 3 | Member Account 4 |
| http://sample.com/1 | #marketing | a@xfood.com a@chat.com | b@xfood.com b@chat.com | c@xfood.com c@chat.com | d@xfood.com d@chat.com |
| http://sample.com/2 | #team1 | f@xfood.com f@chat.com | g@xfood.com g@chat.com | h@xfood.com h@chat.com | |
| . . . | . . . | . . . | . . . | . . . | . . . |

Table 3 illustrates an example data structure of association information stored in the association information DB 491. The association information is information associating the account of the reservation management system with the group of the chat system. The association information includes items of the workspace, the channel and the member accounts 1 to n (n=4 in Table 3). The same description given above with reference to Table 2 of the workspace and the channel applies to the workspace and the channel of Table 3. In the member accounts 1 to n, the accounts of participants issued by the reservation management server 20 are registered. The accounts of the chat system can be also registered in the association information, as indicated in Table 3. To send a notification to the group, information identifying the account, issued by the reservation management server 20, of the user who made a reservation of a meeting to the reservation management server 20 and information (in the present embodiment, the workspace and the channel name) identifying the group and channel of the notification destination will suffice. In other words, the accounts of all the members belonging to the group are not necessarily registered in the association information. However, the account information of the chat system of each individual user is required when sending a notification to the individual user. Accordingly, the account of the user of the chat system can also be registered in the association information, as indicated in Table 3.

TABLE 4

Meeting Management Information DB:

| Reservation ID | Account of reservation-making user | Meeting name | Meeting room ID | Start time | End time | Account of expected participant | Status |
|---|---|---|---|---|---|---|---|
| 001 | a@xfood.com | Product Z development meeting | K-001 | 2017 Jul. 7 10:00 | 2017 Jul. 7 12:00 | b@xfood.com c@xfood.com d@xfood.com | Checked in |
| 002 | e@xfood.com | Product Y development meeting | K-001 | 2017 Jul. 7 13:00 | 2017 Jul. 7 14:00 | f@xfood.com g@xfood.com | Notified |
| ... | ... | ... | ... | ... | ... | ... | ... |

Table 4 illustrates an example data structure of the meeting management information stored in the meeting management information DB 493 of the meeting management server 30. Since the reservation information is included in the management information stored in the meeting management information DB 493, in the following description of Table 4, differences from the reservation information DB 291 of Table 1 are described. The meeting management information of Table 4 includes items of a reservation-making user's name, a reservation-making user's department name, a participant's name, a participant's department name, and a status. The reservation-making user's name is a name of a user who made the reservation. The reservation-making user's department name is a name of a department to which the user who made the reservation belongs. The participant's name is a name or the like of a participant. The participant's department name is a name of a department to which the participant belongs. Since the meeting management server 30 holds or can use user information associating the account with the name, the department name or the like, when the account is obtained, the name and the department name are identified. It should be noted that at the time when the reservation information is transmitted from the reservation management server 20, the reservation information can include the reservation-making user's name, the reservation-making user's department name, the participant's name, and the participant's department name.

The status indicates the status of a reservation. For example, the status registered in the meeting management information of Table 4 indicates whether a notification of the information about the reservation of the meeting room 6 has been sent, whether the use of the meeting room has been confirmed, whether the check-in operation has been performed, whether the check-out operation has been performed, or whether the reservation has been cancelled.

TABLE 5

Meeting Identification Information DB:

| Reservation ID | Meeting room ID | Meeting identification information |
|---|---|---|
| 001 | K-001 | 1234 |
| 002 | K-002 | 5678 |
| ... | ... | ... |

Table 5 illustrates an example data structure of meeting identification information management information stored in the meeting identification information DB 494. The meeting identification information management information is information for managing the meeting identification information for each reservation of the meeting room 6. The meeting identification information management information includes items of the reservation ID, the meeting room ID, and the meeting identification information. The reservation ID, the meeting room ID, and the meeting identification information of the meeting identification information management information in Table 5 are the same or substantially the same as those of the reservation information (the reservation information acquired from the reservation management server 20), which further includes the status. Accordingly, the redundant descriptions thereof are omitted. It should be noted that the reservation ID is registered in order to identify the reservation of the same meeting room 6.

TABLE 6

Customer Domain DB:

| Customer domain name | Customer administrator's account |
|---|---|
| xfood.com | a@xfood.com |
| ycar.com | f@ycar.com |
| ... | ... |

Table 6 illustrates an example data structure of customer domain information stored in the customer domain DB 495. The customer domain information is information for managing a customer's domain name and an account of an administrator of the customer. The customer domain information stores a domain name of a customer with an administrator's account. The domain name of the customer in Table 6 is the domain name of the account (e-mail address) issued by the reservation management server 20. The administrator's account is an account of an administrator (representative) of the customer. The reservation management server 20 issues the accounts in Table 6.

TABLE 7

Notification Settings DB:

| Customer domain name | Notification setting |
|---|---|
| xfood.com | One day before |
| ycar.com | 12 hours before |
| ... | ... |

Table 7 illustrates an example data structure of notification setting information stored in the notification settings DB 496. The notification setting information includes, for each of the customers, a setting relating to a notification. The notification setting information stores the domain name of the customer in association with a notification setting. The notification setting indicates a timing at which the information about the reservation of the meeting room 6 is to be notified. In this example, the timing defines how long ahead the start time of the meeting the notification of the information about the reservation of the meeting room is to be sent. In another example, a fixed date and time can be set in the notification setting. Further, the number of the timings set in the notification setting is not necessarily one. In another example, a plurality of notification settings can be registered in association with one customer.

TABLE 8

| Control Information DB: | |
| --- | --- |
| Meeting room ID | Control content |
| K-001 | Power On |
| K-002 | Power Off |
| . . . | . . . |

Table 8 illustrates an example data structure of control information stored in the control information DB 497. The control information is information for controlling the electronic device 70 located in the meeting room 6. The control information includes items of the meeting room ID and a control content. The control content indicates a specific control operation of the electronic device 70. The meeting management server 30 can set a detailed control content for each electronic device 70. This control information does not include information indicating a time at which the electronic device 70 is to be controlled. This is because it is difficult for the meeting management server 30 to access the meeting room terminal 90, since the meeting management server 30 resides on the external network N2. Accordingly, the meeting room terminal 90 accesses the meeting management server 30. The meeting management server 30 transmits the control content, when the control information has already been generated when being accessed from the meeting room terminal 90.

TABLE 9

| Customer ID | Meeting Room Name | Meeting Room ID | Status of Meeting Room Terminal | Authentication key | Management Start Flag | Battery | Serious Error |
| --- | --- | --- | --- | --- | --- | --- | --- |
| G-001 | Meeting room A | K-001 | Connected | ***** | True | 70% | — |
|  | Meeting room B | K-002 | Before Setup | ***** | False | Full | — |
|  | Meeting room C | K-003 | Disconnected | ***** | True | Full | Error Present |
|  | Meeting room D | K-004 | Connected | **** | True | Full | — |
|  | Meeting room E | K-005 | Connected | ***** | True | Full | — |

| Customer ID | Meeting Room Name | No Access Right | No Authorization for Reservation | Log | Screenshot |
| --- | --- | --- | --- | --- | --- |
| G-001 | Meeting room A | — | — | 20xx12211255.txt | 20xx12211255.jpg |
|  | Meeting room B | — | — | 20xxxxxxxxxx.txt | 20xxxxxxxxxx.jpg |
|  | Meeting room C | — | — | 20xxxxxxxxxx.txt | 20xxxxxxxxxx.jpg |
|  | Meeting room D | Error Present | — | 20xxxxxxxxxx.txt | 20xxxxxxxxxx.jpg |
|  | Meeting room E | — | Error Present | 20xxxxxxxxxx.txt | 20xxxxxxxxxx.jpg |

Table 9 illustrates an example data structure of meeting room setting information stored in the meeting room setting information DB 498. The meeting room setting information is information relating to settings of each meeting room. The meeting room setting information includes, in association with the customer ID, items of a meeting room name, the meeting room ID, a state of the meeting room terminal, an authentication key, a management start flag, a battery, a serious error, no access right, no authorization for reservation, a log, and a screenshot. The meeting room name is a general-purpose name of a meeting room recognized by participants attending in the meeting. Examples of the meeting room name include a name that is presented at the entrance of the meeting room. The meeting room ID is identification information for uniquely identifying a meeting room, as described above. In one example, the meeting room ID are common to the meeting room setting information and the reservation management server 20, to simplify the configuration and operation. In another example, a conversion table is provided that allows the administrator to set the different meeting room ID from that stored in the reservation management server 20. The state of the meeting room terminal indicates whether the configuration of initial settings of the meeting room terminal 90 has been completed, whether communication is possible, and the like. "Disconnected" in the status of the meeting room terminal indicates a state in which communication with the meeting room terminal 90 is disconnected. "Connected" in the state of the meeting room terminal indicates a state in which communication is confirmed within a certain time period. "Before setup" in the state of the meeting room terminal indicates a state in which the initial settings have not been configured yet. "Disconnected" in the state of the meeting room terminal indicates a state in which no communication has been performed for equal to or longer than a certain time period. The authentication key is authentication information used by the meeting management server 30 to authenticate the meeting room terminal 90. The authentication key is transmitted to the meeting room terminal 90 by the initial settings. The meeting room terminal 90 stores the received authentication key. At the time of communication, the meeting room terminal 90 is authenticated by the authentication key. The authentication key is a combination of numbers, alphabets, symbols, and the like that are too long to be identified by the brute force attack. In one example, the meeting management server 30 determines the authentication key. In another example, the administrator determines the authentication key. The management start flag is a flag indicating whether the meeting management server 30 starts managing the meeting room after the initial settings of the meeting room terminal 90 has been configured. The value True set in the management start flag indicates that the meeting management server 30 starts managing the meeting room. The value False set in the management start flag indicates that the meeting management server 30 does not start managing the meeting room. The management start flag substantially eliminates inconveniences caused by a time lag between the time when the configuration of the initial settings is completed and the time when the meeting room terminal 90 is arranged in the meeting room. The value in the "battery" indicates the charge remaining of the meeting room terminal 90 located in the meeting room. Since the battery of the meeting room terminal 90 is continuously charged from the power source, the charge remaining is normally FULL (fully charged). However, when the meeting room terminal 90 is disconnected from the power source, the batter charge remaining gradually decreases. "Error present" recorded in the "serious error" indicates that an error that needs to be promptly fixed is detected in the meeting room terminal 90. For example, a serious error is recorded when the meeting management server 30 fails to communicate with the meeting room terminal 90 (i.e., disconnected). "Error present" registered in the "no access right" indicates that the meeting management server 30 does not have the authorization to acquire information on the corresponding meeting room from the reservation management server 20. More specifically, the meeting management server 30 fails to acquire the reservation information of the corresponding meeting room. Since an account (e.g., a user ID and a password) is registered for each of the meeting rooms in the reservation management server 20, the reservation information obtainer 33 of the meeting management server 30 needs to specify a correct account for each of the meeting rooms to acquire reservation information. When "error present" is registered in the "no access right" in the meeting room setting information, it indicates that the account of either the reservation management server 20 or the meeting management server 30 is set in error. When "error present" is registered in the "no authorization for reservation" in the meeting room setting information, it means that the meeting management server 30 does not have authorization to make a reservation for the corresponding meeting room. As described later, during a time period when a certain meeting room is not reserved, a user operates the meeting room terminal 90 located in the certain meeting room to make a request for reservation of the certain meeting room that the user is to use immediately. The request for reservation is transmitted from the meeting room terminal 90 to the meeting management server 30 and further transmitted to the reservation management server 20. When transmitting the request for reservation to the reservation management server 20, the meeting management server 30 needs authorization for reservation for each of the meeting rooms. Examples of the authorization for reservation include a token received from the reservation management server 20. In a case where no token or the like is assigned to the meeting management server 30 from the reservation management server or in a case where the administrator deletes the token or the like, the reservation management server 20 determines that the meeting management server 30 has no authorization for reservation. The log is information obtained by recording a processing content, an internal state, an operation content, and the like of the meeting room terminal 90. The meeting room terminal 90 records a log in response to detection of an error. The meeting room terminal 90 also records a log in response to an instruction from the meeting management server 30. Alternatively, the meeting room terminal continuously records a log and repeats a process of overwriting (deleting) the oldest log with the new log. When the meeting management server 30 and the meeting room terminal 90 can communicate with each other, the meeting room terminal 90 can transmit the recorded log. The screenshot is a screenshot (image data) of a screen displayed by the meeting room terminal 90 at the timing when an error is detected is registered. The meeting room terminal 90 may record a screenshot in response to an instruction from the meeting management server 30. When the meeting management server 30 and the meeting room terminal 90 can communicate with each other, the meeting room terminal 90 can transmit the recorded screen shot.

TABLE 10A

Error Code Information of Errors to be Detected at Server

| | Error Type | Error Number |
|---|---|---|
| 1 | Fail to communicate with meeting room terminal | 0x0100 |
| 2 | Fail to access reservation management server | 0x0200 |
| 3 | No authorization for reservation to reservation management server | 0x0400 |
| 4 | Management of meeting room is not started yet | 0x0800 |

TABLE 10B

Error Code Information of Errors to be Detected at Meeting Room Terminal:

| | Error Type | Error Number |
|---|---|---|
| 1 | Wi-Fi is off | 0x0001 |
| 2 | Not connected to Wi-Fi | 0x0002 |
| 3 | Fail to communicate with server | 0x0004 |
| 4 | Battery charge remaining is less than 80% | 0x0008 |

Table 10A and Table 10B are example data structures of error code information stored in the error code DB 499. Table 10A is an example of data structure of error code information of errors to be detected at the meeting management server 30. Table 10B is an example of data structure of error code information of errors to be detected at the meeting room terminal 90. The error code information is information associating error numbers with error types. The error number is identification information based on which an error is identified.

More specifically, the error code information of errors to be detected at the meeting management server 30 are "1. Fail to communicate with meeting room terminal", "2. Fail to access reservation management server", "3. No authorization for reservation to reservation management server", and "4. Management of meeting room is not started yet". "4. Management of meeting room is not started yet" corresponds to that the value False is registered in the management start flag in the meeting room setting information DB 498.

Further, the error code information of errors to be detected at the meeting room terminal 90 are "1. Wi-Fi is off", "2. Not connected to Wi-Fi", "3. Fail to communicate with server", and "4. Battery charge remaining is less than 80%". "1. Fail to communicate with meeting room terminal" in the error code information of errors to be detected at the meeting management server 30 corresponds to "1. Wi-Fi is off", "2. Not connected to Wi-Fi" and "3. Fail to communicate with server" in the error code information of errors to detected at the meeting room terminal 90. One error type in the error code information of errors to detected at the meeting management server 30 corresponds to three error types in the error code information of errors to be detected at the meeting room terminal 90, because a cause of error is identified at the meeting room terminal 90 in a greater variety than at the meeting management server 30. These three error types are collectively referred to simply as "communication interruption" or "communication is interrupted". The reason why the meeting management server 30 stores the error code information of errors detected at the meeting room terminal 90 is to identify the error type based on an error code transmitted from the meeting room terminal 90. In substantially the same manner, the meeting room terminal 90 also stores the error code information of errors detected at the meeting management server 30.

The smaller the error number, the more fundamental the cause of the error. For example, in the error code information of errors to detected at the meeting management server 30, "2. Fail to access reservation management server" is more fundamental cause than "3. No authorization for reservation to reservation management server". Further, for example, in the error code information of errors to be detected at the meeting room terminal 90, the cause of the error type "1. Wi-Fi is off" is more fundamental than the cause of the error type "2. Not connected to Wi-Fi". In substantially the similar manner, the cause of the error type "2. Not connected to Wi-Fi" is more fundamental than the cause of the error type "3. Fail to communicate with server". Since as described above, the more fundamental the cause of the error, the smaller the value of the error number associated with the error type, the meeting management server 30 and the meeting room terminal 90 give a higher priority to the error associated with the smaller value of the error number when identifying the cause of error. Further, the meeting management server 30 and the meeting room terminal 90 give a higher priority to the error associated with the smaller value of the error number when outputting an error.

Registration Terminal:

The registration terminal 50 includes a communication unit 51, an operation reception unit 52, and a display control unit 53. These functional units of the registration terminal 50 are functions are means that are implemented by operating one or more hardware components illustrated in FIG. 4 in cooperation with instructions of the CPU 201 according to the program 209p loaded from the HDD 209 to the memory 202. The program 209p is distributed from a server for program distribution. Alternatively, the program 209p is distributed on a storage medium.

The registration terminal 50 is a terminal, by using which the administrator configures various settings to the meeting room via a web page provided by the meeting management server 30. In the present embodiment, the registration terminal 50 is used for displaying the management screen 501. The functions of the communication unit 51, the operation reception unit 52, and the display control unit 53 of the registration terminal 50 are the same or substantially the same as those of the terminal apparatus 60. A detailed description thereof will be given below, with reference to the description of the terminal apparatus 60.

Figure 7:
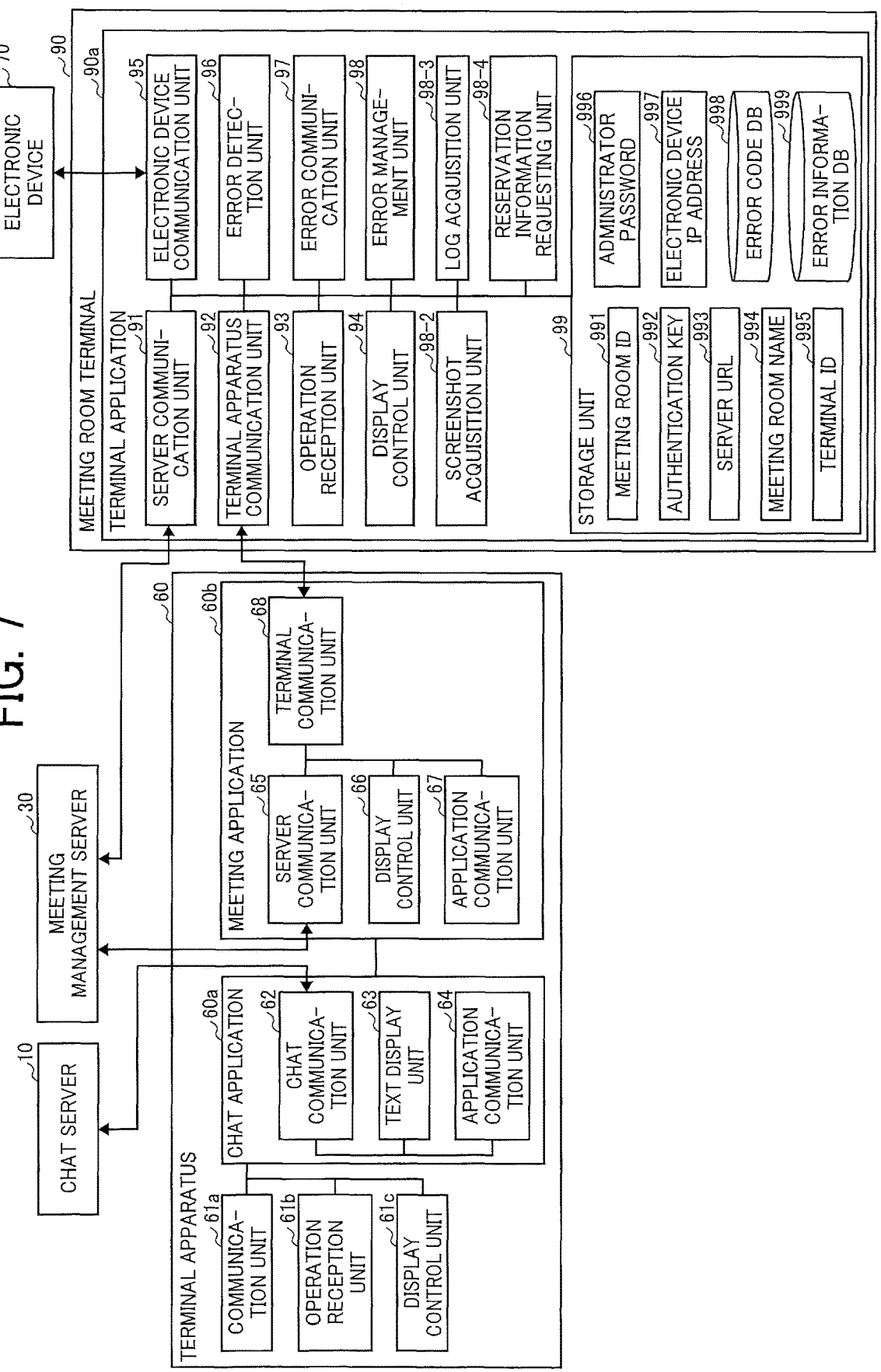
FIG. 7 is a block diagram illustrating functional configurations of a terminal apparatus and the meeting room terminal, according to an embodiment of the present disclosure.

Terminal Apparatus:

FIG. 7 is a block diagram illustrating functional configurations of the terminal apparatus 60 and the meeting room terminal 90. The functions of the electronic device 70 will be described as needed.

The terminal apparatus 60 includes a communication unit 61a, an operation reception unit 61b, a display control unit 61c, a chat communication unit 62, a text display unit 63, an application communication unit 64, a server communication unit 65, a display control unit 66, an application communication unit 67, and a terminal communication unit 68. These functional units of the terminal apparatus 60 are functions or means that are implemented by operating one or more hardware components illustrated in FIG. 4 in cooperation with instructions of the CPU 201 according to the program 209p loaded from the HDD 209 to the memory 202. The program 209p is distributed from a server for program distribution. Alternatively, the program 209p is distributed on a storage medium. Since a chat application 60a and a meeting application 60b operate on the terminal apparatus 60, the program 209p includes the chat application 60a and the meeting application 60b.

The communication unit 61a transmits and receives various types of information to and from the meeting management server 30 and the reservation management server 20. The chat application 60a communicates with the chat server 10 and the meeting application 60b communicates with the meeting management server 30. The communication unit 61 communicate with any server. The communication unit 61a can be provided as a function of a browser, for example.

The operation reception unit 61b receives various operations that are input by the participant to the terminal apparatus 60. The display control unit 61c interprets screen information of various screens to display screens on the LCD 206. The operation reception unit 61b and the display control unit 61c have, for example, a browser function and can execute a web application. For example, the display control unit 61c displays a reservation setting screen received from the reservation management server 20, and the operation reception unit 61b receives reservation information set by a user who is to make a reservation.

The chat communication unit 62 of the chat application 60a transmits and receives various types of information to and from the chat server 10. In the present embodiment, the chat communication unit 62 receives information about the reservation of the meeting room 6 from the chat server 10. Further, the chat communication unit 62 sends, to the chat server 10, a notification indicating that a message of the information about the reservation of the meeting room 6 has been read and a notification indicating whether the meeting room 6 is to be used or canceled.

The text display unit 63 of the chat application 60a displays text (the information about the reservation of the meeting room 6) transmitted from the chat server 10. For example, the text display unit 63 displays the text as if the source of the message is the bot and as if the bot inputs the text.

The application communication unit 64 of the chat application 60a invokes the meeting application 60b and transmits the meeting identification information to the meeting application 60b. The chat server 10 transmits information identifying the meeting application 60b to the terminal apparatus 60, when notifying the terminal apparatus 60 of the information about the reservation of the meeting room 6. Accordingly, the chat application 60a specifies the meeting application 60b to the OS and requests notification of the meeting identification information. The OS activates the meeting application 60b.

The server communication unit 65 of the meeting application 60b communicates with the meeting management server 30. For example, the server communication unit 65 obtains a two-dimensional code including the meeting identification information from the meeting management server 30. The two-dimensional code is used for authentication at check-in. Instead of or in addition to the two-dimensional code, numbers of a several digits can be used for authentication.

The display control unit 66 of the meeting application 60b displays the two-dimensional code or the like including meeting identification information on the LCD 206. The application communication unit 67 of the meeting application 60b obtains various kinds of information from the chat application 60a via the OS. Examples of the various kinds of information obtained from the chat application 60a include the meeting identification information included in the information about the reservation of the meeting room 6.

The terminal communication unit 68 communicates with the meeting room terminal 90 to transmit the meeting identification information, etc. The terminal communication unit 68 detects the meeting room terminal 90 using a short-range wireless communication network such as Bluetooth (registered trademark). In response to detecting the meeting room terminal 90, the terminal communication unit 68 transmits the meeting identification information to the detected meeting room terminal 90. Further, the terminal communication unit 68 provides a function of displaying the two-dimensional code to the meeting room terminal 90. In other words, the terminal communication unit 68 causes the meeting room terminal 90 to capture the two-dimensional code.

Meeting Room Terminal:

The meeting room terminal 90 includes a server communication unit 91, a terminal apparatus communication unit 92, an operation reception unit 93, a display control unit 94, an electronic device communication unit 95, an error detection unit 96, an error notification unit 97, an error management unit 98, a screenshot acquisition unit 98-2, a log acquisition unit 98-3, and a reservation information request unit 98-4. These functional units of the meeting room terminal 90 are functions or means that are implemented by operating one or more hardware components illustrated in FIG. 5 in cooperation with instructions of the CPU 601 according to the program 604p loaded from the EEPROM 604 to the RAM 603. The program 604p includes the terminal application 90a. The program 604p is distributed from a server for program distribution. Alternatively, the program 604p is distributed on a storage medium. These functions are implemented by installing the terminal application 90a in the meeting room terminal 90.

The server communication unit 91 communicates with the meeting management server 30 with a server URL 993 as a destination. Since the meeting room terminal 90 resides on the intra-company network N1, accessing from the meeting management server 30 to the meeting room terminal 90 is difficult. For this reason, the server communication unit 91 polls the meeting management server 30 to periodically communicate with the meeting management server 30. In addition to or in alternative to the polling, the server communication unit 91 communicates with the meeting management server 30 using a communication technology such as WebSocket. The server communication unit 91 performs communication using a communication protocol such as HTTP. Any other suitable communication protocol other than HTTP can be used.

The server communication unit 91 according to the present embodiment receives the reservation information and transmits, to the meeting management server 30, the meeting identification information, which is received by the terminal apparatus communication unit 92 from the terminal apparatus 60 or is manually input at the time of check-in. Further, the server communication unit 91 receives the control information from the meeting management server 30.

The terminal apparatus communication unit 92 communicates with the terminal apparatus 60. In the present embodiment, the terminal apparatus communication unit 92 receives the meeting identification information, etc. In a case where the meeting identification information is manually input, the terminal apparatus communication unit 92 can be omitted. The terminal apparatus communication unit 92 is implemented by the short-range wireless communication device 615 or the RF tag reader/writer 622 of FIG. 5, which operates under control of the CPU 601 executing the program 604p.

The electronic device communication unit 95 communicates with the electronic device 70. In the present embodiment, the electronic device communication unit 95 transmits, to the electronic device 70, the control information received by the server communication unit 91. The electronic device communication unit 95 is implemented by the wireless LAN communication device 613 of FIG. 5, which operates under control of the CPU 601 executing the program 604p.

The error detection unit 96 detects an error occurring at the meeting room terminal 90 and identifies the cause of the detected error. Errors that occur at the meeting room terminal 90 are the four errors described above with reference to the error code information of Table 10B. The error code information of Table 10B is also stored in an error code DB 998 stored in a storage unit 99. In a case where an error corresponding to the error type "1. Wi-Fi is off" or the error type "2. Not connected to Wi-Fi" in the error code information of errors detected at the meeting room terminal 90 occurs, a time-out occurs when the meeting room terminal 90 is to communicate with the meeting management server 30. When the time-out occurs, the error detection unit 96 of the meeting room terminal 90 sends an inquiry to the OS of the meeting room terminal 90 to detect that Wi-Fi is off. In a case where Wi-Fi is not off, the error detection unit 96 of the meeting room terminal 90 sends an inquiry to the OS to determine whether a service set identifier (SSID) to which the meeting room terminal connects can be acquired. When the SSID is not acquired, the error detection unit 96 determines that an error corresponding to the error type "2. Not connected to Wi-Fi" has occurred. Even when an error corresponding to the error type "3. Fail to communicate with server" occurs, a time-out does not occur. This error is detected based on the 400-series HTTP status codes or a negative acknowledgement (NACK) (or any equivalent response) received by the meeting room terminal 90.

The error notification unit 97 transmits the error number of an error that has occurred at the meeting room terminal 90 to the meeting management server 30 with the meeting room ID of the meeting room 6 where the meeting room terminal 90 is located. The error detection unit 96 also transmits a log and a screenshot to the meeting management server 30. In a case where communication between the meeting room terminal 90 and the meeting management server 30 is interrupted when the error is detected, the error detection unit 96 transmits the log and the screenshot to the meeting management server 30 immediately after the communication is restored.

The error management unit 98 registers the error information of an error detected by the error detection unit 96 in an error information DB 999. The error management unit 98 further registers a log and a screenshot in the error information DB 999. Thus, the error number, the log, and the screenshot are notified to the meeting management server 30 when communication is restored.

The screenshot acquisition unit 98-2 acquires a screenshot of a screen that is displayed by the meeting room terminal 90 at the timing when the error detection unit 96 detects an error. Also, the screenshot acquisition unit 98-2 acquires a screenshot in response to an instruction from the meeting management server 30.

The log acquisition unit 98-3 records a processing content, an internal state, an operation content, and the like as a log at the timing when the error detection unit 96 detects an error. Also, the log acquisition unit 98-3 acquires a log in response to an instruction from the meeting management server 30. Alternatively, the log acquisition unit 98-3 can record a log each time any event including an error occurs. When the total data size of the recorded logs exceeds a predetermined amount, the log acquisition unit 98-3 overwrites the oldest log with a log that is recorded most recently. In other words, the log acquisition unit 98-3 deletes logs from the oldest log in order. In this case, logs prior to detection of an error are recorded.

At periodical timings when the reservation information is to be acquired, the reservation information request unit 98-4 transmits, to the meeting management server 30, a meeting room ID 991 and an authentication key 992 via the server communication unit 91. The meeting management server 30 as a destination to which the meeting room ID 991 and the authentication key 992 are to be transmitted is specified by the server URL 993 stored in the storage unit 99. As a response to the transmission of the meeting room ID 991 and the authentication key 992, the reservation information request unit 98-4 acquires the reservation information via the server communication unit 91. It is sufficient that the reservation information be acquired when any change is made in the reservation information. Examples of the periodical timings when the reservation information request unit 98-4 acquires the reservation information include from every several seconds to every several minutes. The shorter the periodical timings, the sooner the reservation information updated. However, The shorter the periodical timings, the greater the communication load. Accordingly, the periodical timings are determined in view of both the update frequency of the reservation information and the communication load. In the present embodiment, the reservation information request unit 98-4 acquires the reservation information every thirty seconds, for example. Further, the reservation information request unit 98-4 receives at least the meeting management information (reservation information) of the meeting room 6 of the current day via the server communication unit 91.

The meeting room terminal 90 further includes the storage unit 99. The storage unit 99 is implemented by, for example, the ROM 602 and the EEPROM 604 of FIG. 5. The storage unit 99 stores the meeting room ID 991, the authentication key 992, the server URL 993, a meeting room name 994, a terminal ID 995, an administrator password 996, and an IP address 997 of the electronic device 70. The storage unit 99 further stores the error code DB 998 and the error information DB 999. The error code DB 998 is the same or substantially the same as the error code DB 499 of the meeting management server 30.

TABLE 11

| Occurrence Time | Error Number | Log | Status | Notification |
| --- | --- | --- | --- | --- |
| 20xx/12/21 12:55 | 0x0001 | 20xx12211255.txt | 20xx12211255.jpg | Transmitted |
| 20xx/12/22 15:31 | 0x0002 | 20xx12221531.txt | 20xx12221531.jpg | Not transmitted yet |

Table 11 is an example data structure of error information stored in the error information DB 999. The error information includes items of an occurrence time, an error number, a log, a screenshot, and a notification. In the occurrence time, the date and time when an error is detected is recorded. In the error number, a value acquired from the error code DB 998 is recorded. In the log, a file name of a log stored at the timing when an error is detected is recorded. In the screenshot, a file name of a screenshot that was stored at the timing when the error was detected is recorded. In the notification, information is recorded that indicates whether the error number, the log, and the screenshot are transmitted to the meeting management server 30. Even when communication between the meeting room terminal 90 and the meeting management server 30 is interrupted, the meeting room terminal 90 can record the error information in the error information DB 999.

Figure 8:
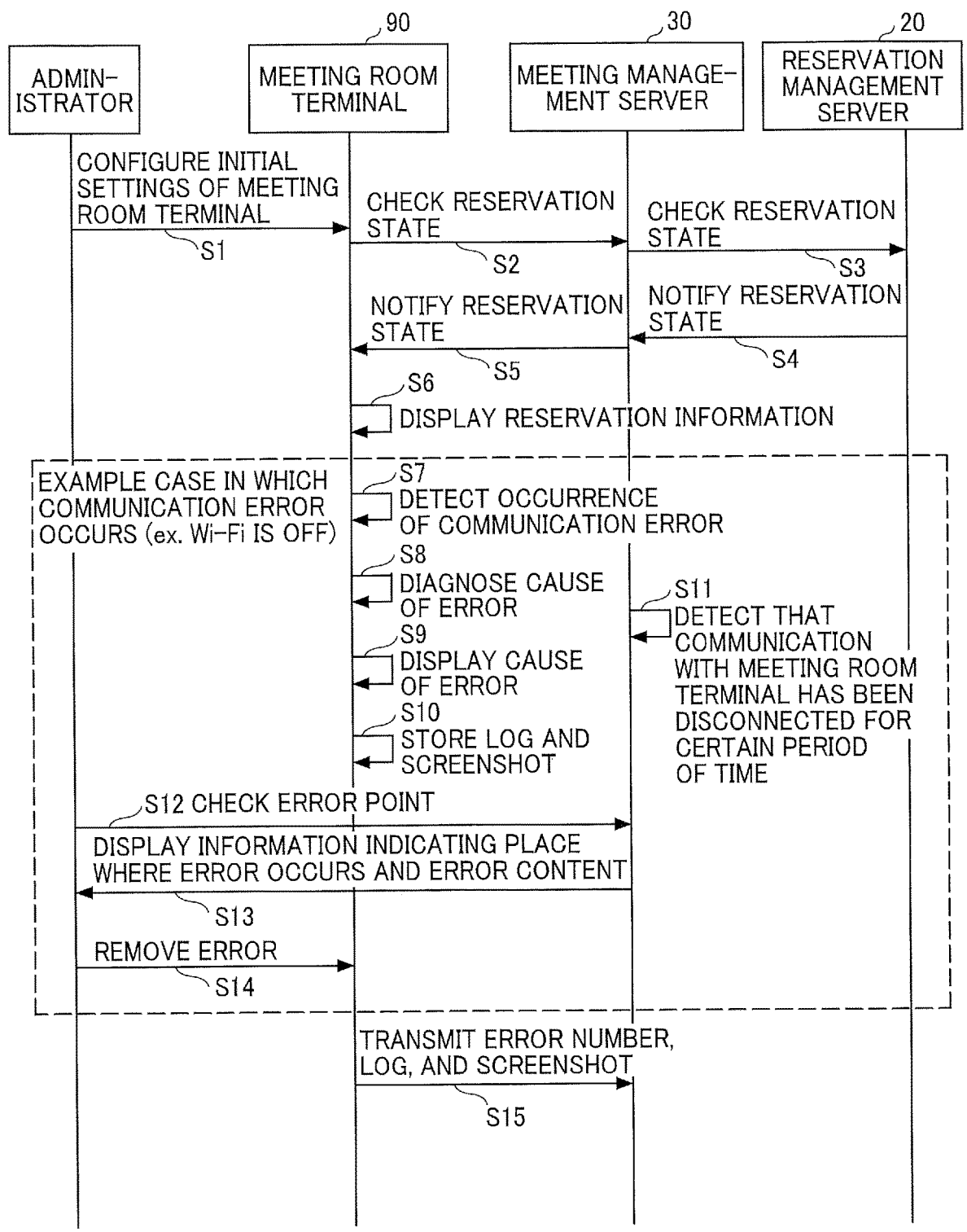
FIG. 8 is a sequence diagram illustrating an example operation performed by the resource reservation system of handling an error that has occurred at the meeting room terminal, according to an embodiment of the present disclosure.

Operation:

First, a description is given of an overview of an operation performed when an error occurs at the meeting room terminal 90, with reference to FIG. 8. FIG. 8 is a sequence diagram illustrating an example operation performed by the resource reservation system 100 of handling an error that has occurred at the meeting room terminal 90.

S1: The administrator associates the meeting room terminals 90 with the meeting rooms in order to specify which meeting room terminal 90 is located in which meeting room. This process is called "initial settings", for example. More specifically, the initial settings refer to causing the meeting room terminal 90 to store communication setting information such as the meeting room ID 991, the authentication key 992, the server URL 993, the meeting room name 994, and the terminal ID 995. By using the communication setting information, the meeting room terminal 90 can start acquiring reservation information from the meeting management server 30 (in a case where the management start flag is on).

S2: In a case where communication between the meeting management server 30 and the meeting room terminal 90 is not interrupted, the reservation information request unit 98-4 of the meeting room terminal 90 periodically transmits a request for reservation information to the meeting management server 30.

S3 to S5: The meeting management server 30 sends a request for a list of reservation information of each meeting room to the reservation management server 20 periodically or when any change is made in the reservation information. As a response to the request, the meeting management server 30 acquires the reservation information of each meeting room. Further, the meeting management server 30 transmits the acquired reservation information for each meeting room in response to the request from the meeting room terminal 90.

Figure 17:
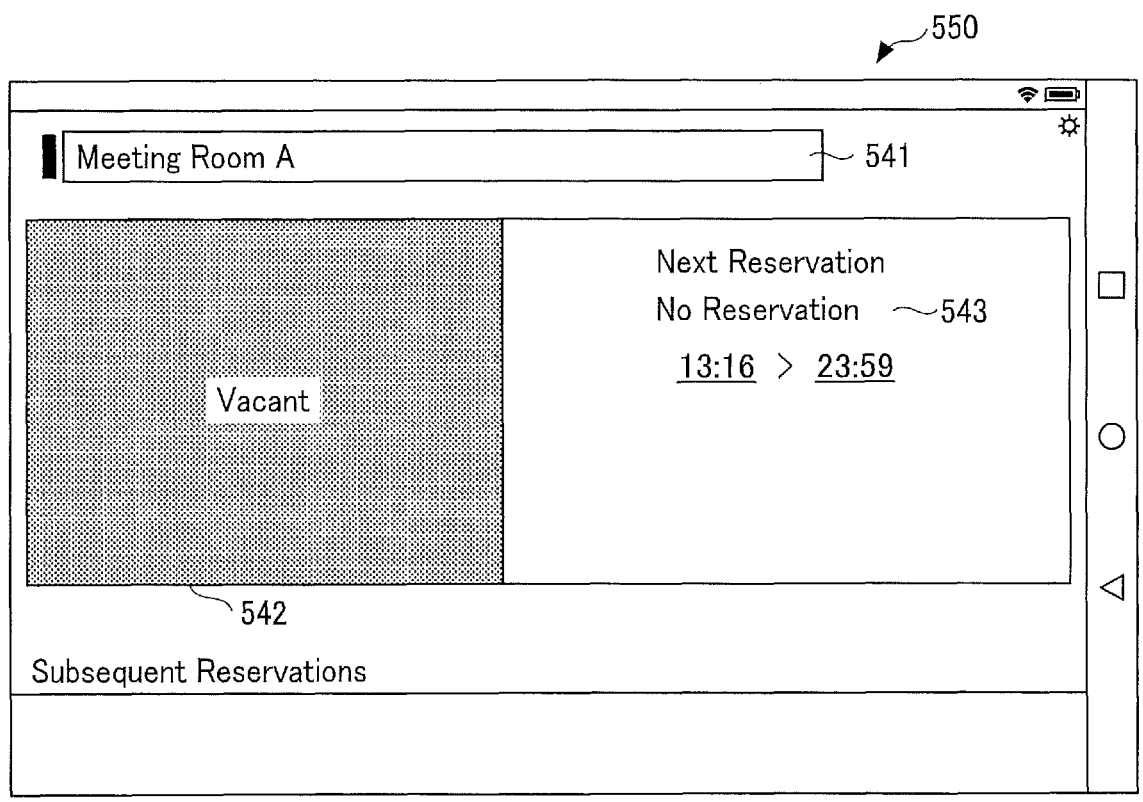
FIG. 17 is a diagram illustrating an example of a standby screen, on which a use now button is displayed in a manner so that the use now button is unselectable, according to an embodiment of the present disclosure.

S6: The display control unit 94 of the meeting room terminal 90 displays the reservation information as a standby screen and accepts a check-in of from a participant who participates in the meeting. FIG. 17 illustrates an example of the standby screen.

Subsequently, it is assumed that any one of communication interruption errors, i.e., corresponding to error types "1. Wi-Fi is off", "2. Not connected to Wi-Fi", and "3. Fail to communicate with server" has occurred at the meeting room terminal 90. S7: When for example, a time-out occurs after the reservation information request unit 98-4 requests reservation information, the error detection unit 96 detects the occurrence of an error.

S8: The error detection unit 96 refers to the error code DB 998 to identify the cause (error type) of the detected error in the order of error numbers. More specifically, the error detection unit 96 first sends an inquiry as to whether the Wi-Fi is on or off to the OS. When a response from the OS indicates that Wi-Fi is on, the error detection unit 96 further sends an inquiry about an SSID to the OS. The error management unit 98 refers to the error code DB 998 to identify a particular error number corresponding to the error cause (error type).

Figure 16:
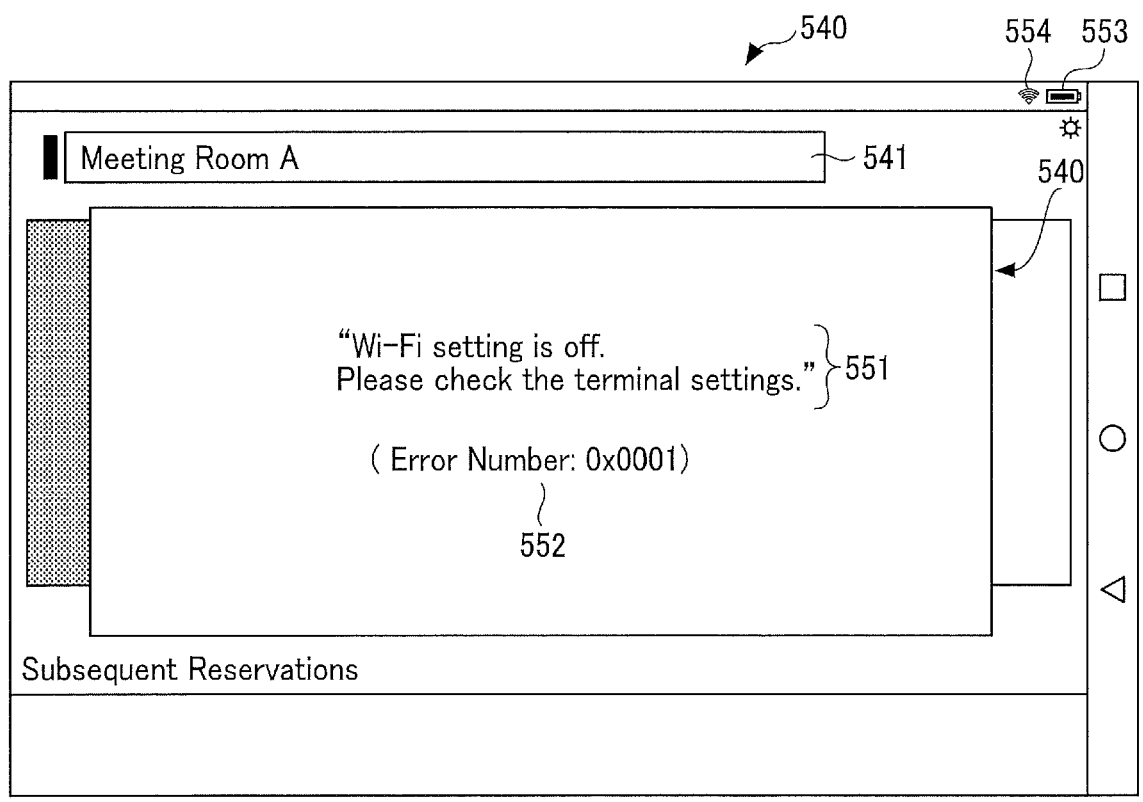
FIG. 16 is a diagram illustrating an example of a screenshot when an error has occurred, according to an embodiment of the present disclosure.

S9: The display control unit 94 of the meeting room terminal 90 displays the identified error type and error number on the display 616 so that the error type and the error number are overlaid on the standby screen. Thus, the meeting room terminal 90 displays the cause of communication failure. FIG. 16 illustrates an example screen on which the error type and the error number are displayed as being overlaid on the standby screen.

S10: The screenshot acquisition unit 98-2 acquires a screenshot of the timing when the error detection unit 96 detects the occurrence of the error. The number of screenshots is not limited to one. For example, the screenshot acquisition unit 98-2 can acquire plural screenshots at different times. The log acquisition unit 98-3 acquires a log of the timing when the error detection unit 96 detects the occurrence of the error.

The error management unit 98 records the error number, the screenshot, and the log in the error information DB 999. Further, the error notification unit 97 notifies the meeting management server 30 of the error number, the screenshot, and the log when the communication interruption is resolved.

S11: On the other hand, the error detection unit 39 of the meeting management server 30 does not receive a request for reservation information for a certain period of time, which request is supposed to be received periodically. In this case, the error detection unit 39 detects the error "1. Fail to communicate with meeting room terminal" (i.e., disconnected). The meeting management server 30 can send an e-mail containing the details of the error to the administrator.

S12: The administrator operates the registration terminal 50 to communicate with the meeting management server 30, to cause the registration terminal 50 to display the management screen 501. A detailed description is given later of the management screen 501.

Figure 13:
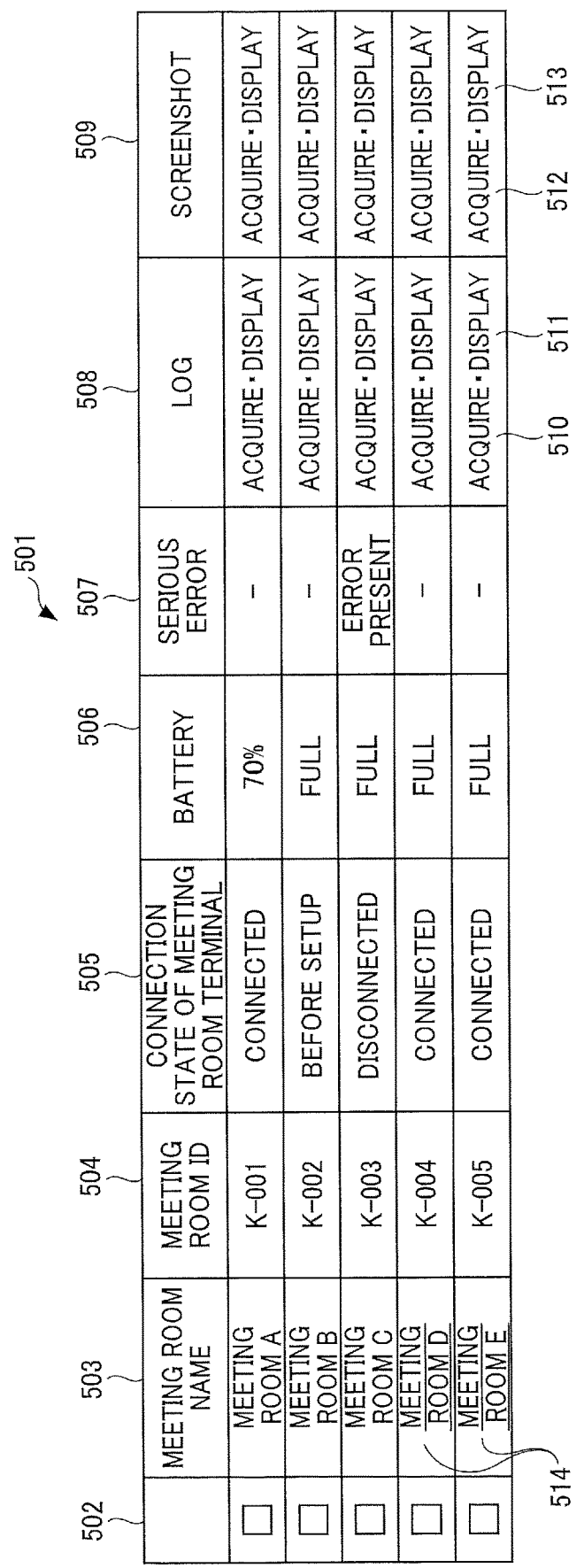
FIG. 13 is a diagram illustrating an example of a management screen displayed by the registration terminal, according to an embodiment of the present disclosure.

S13: The management screen providing unit 42 of the meeting management server 30 transmits screen information of the management screen 501 to the registration terminal 50. The registration terminal 50 displays the management screen 501 based on the screen information received from the meeting management server 30. On the management screen 501, an error is displayed for each meeting room terminal 90 as described above with reference to FIG. 1. The user viewing the management screen 501 can tell the meeting room terminal(s) 90 in which an error has occurred and a content of the error such as failure in communicating with the meeting room terminal 90. Thus, the administrator can identify the meeting room terminal 90 in which an error has occurred, wherever the meeting room terminal 90 is located. FIG. 13 illustrates the details of the management screen 501.

S14: The administrator directly operates the identified meeting room terminal 90 to perform work of causing the meeting room terminal 90 to recover from the error.

S15: When communication is restored, the error notification unit 97 of the meeting room terminal 90 transmits the meeting the error number, the screenshot, and the log to the meeting management server 30 together with the meeting room ID.

Alternatively, the administrator can directly refer to the meeting room terminal 90 to detect that an error has occurred. The meeting room terminals 90 are usually located in different places. Accordingly, in most cases, the administrator first notices the occurrence of error when he or she accesses the meeting management server 30.

Figure 9:
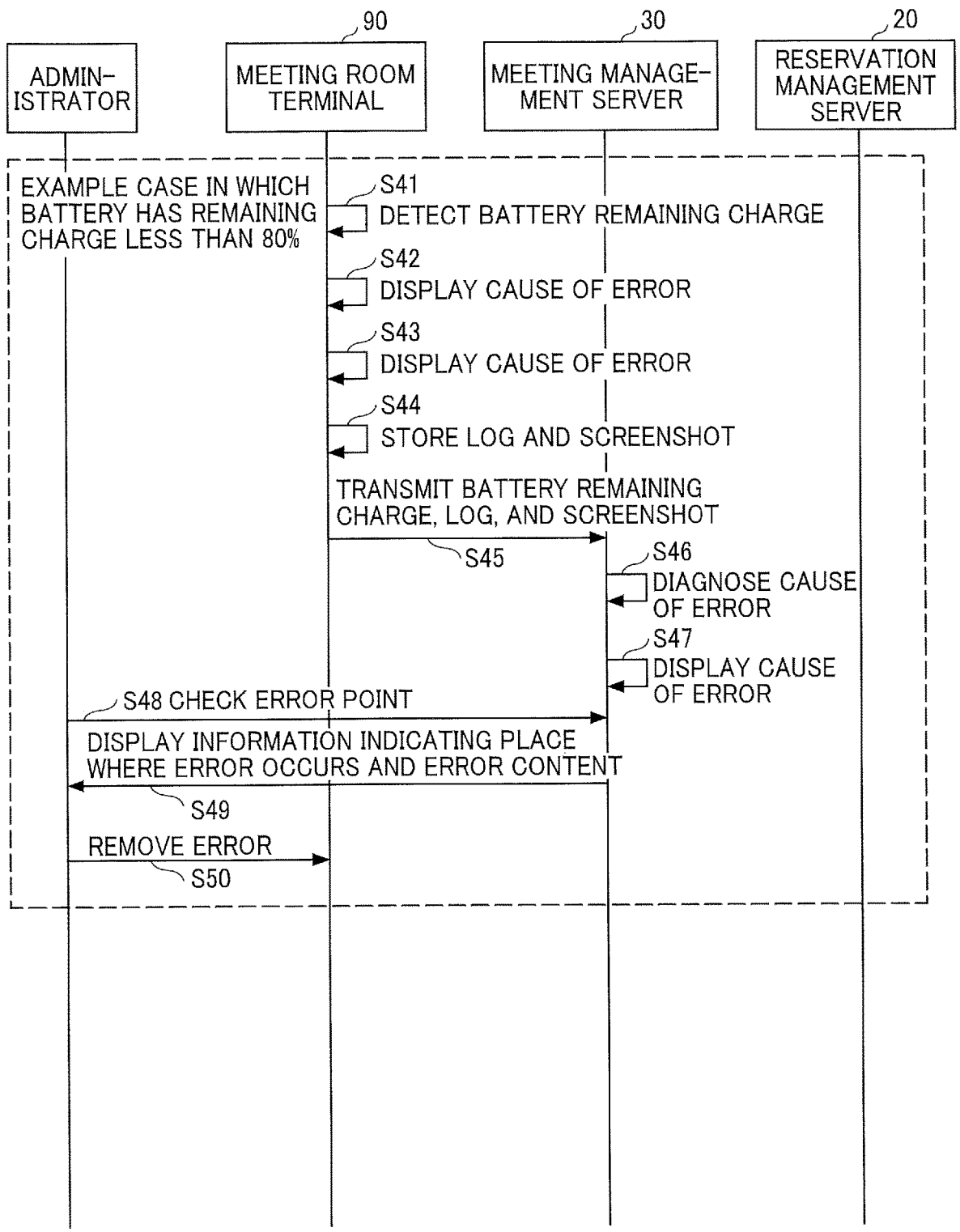
FIG. 9 is a sequence diagram illustrating an example operation performed by the resource reservation system of handling a battery-related error that has occurred at the meeting room terminal, according to an embodiment of the present disclosure.

The description given heretofore with reference to FIG. 8 is of a case in which the error is any one of "1. Wi-Fi is off", "2. Not connected to Wi-Fi", and "3. Fail to communicate with server". A description is now given of an operation performed when the error "4. Battery charge remaining is less than 80%" occurs at the meeting room terminal 90, with reference to FIG. 9. FIG. 9 is a sequence diagram illustrating an example operation performed by the resource reservation system 100 of handling a battery-related error that has occurred at the meeting room terminal 90.

In usual cases, the power is continuously supplied to the meeting room terminal 90. Accordingly, the battery charge remaining usually does not fall below 80%. However, for example, when the power cable is disconnected from the meeting room terminal 90 for some reason or when there is a break in the power cable, the battery charge remaining will decrease, and eventually the charge remaining will be 0%. In this case, the meeting room terminal 90 cannot implement any functions thereof. For this reason, the error "4. Battery charge remaining is less than 80%" is not a complete failure at the current time, however, based on such error, a failure is predicted that the meeting room terminal 90 will be unavailable for use in future. In other words, this error is a sign of a failure detected before use of the meeting room terminal 90 becomes hard.

S41: The error detection unit 96 of the meeting room terminal 90 periodically detects the battery charge remaining. For example, the error detection unit 96 sends an inquiry about the charge remaining to the OS. The error detection unit 96 detects the battery charge remaining at the same timing when the error detection unit 96 acquires reservation information, for example. Thus, the error detection unit 96 can detect the battery charge remaining in the thread of acquiring the reservation information, whereby saving the resources of the meeting room terminal 90. In this case, the battery charge remaining is detected every thirty seconds. Alternatively, the battery charge remaining can be detected at the longer intervals (less frequently).

S42: The error detection unit 96 determines whether the battery charge remaining is less than 80%. When the determination result indicates that the battery charge remaining is less than 80%, the error type "Battery charge remaining is less than 80%" is identified. The error management unit 98 refers to the error code DB 998 to identify the error number.

S43: The display control unit 94 of the meeting room terminal 90 displays the identified error type and error number on the display 616. Thus, the administrator viewing the display of the meeting room terminal 90 can recognize the occurrence of an error, the error type, and the error number.

S44: Further, the screenshot acquisition unit 98-2 acquires a screenshot. The log acquisition unit 98-3 acquires a log. The error management unit 98 records the error number, the screenshot, and the log in the error information DB 999.

S45: Since communication between the meeting management server 30 and the meeting room terminal 90 is not interrupted, the error notification unit 97 of the meeting room terminal 90 causes the server communication unit 91 to transmit the error number, the battery level, the screenshot and the log to the meeting management server 30 together with the meeting room ID.

S46: The receiving unit 31b of the meeting management server 30 receives the error number, the battery charge remaining, the screen shot, and the log. The error management unit 41 refers to the error code DB 499 and checks the error type associated with the error number.

S47: The error management unit 41 registers the battery charge remaining in the item of "battery charge remaining" corresponding to the error type in association with the meeting room ID transmitted from the meeting room terminal 90 in the meeting room setting information DB 498. When the battery charge remaining is equal to or greater than 80%, the meeting room terminal 90 simply transmits the battery charge remaining. In another example, the meeting room terminal 90 transmits information indicating whether or not the meeting room terminal 90 is connected to the power cable to the meeting management server 30.

S48 to S50: In substantially the same manner as steps S12 to S14 of FIG. 8, the administrator identifies a particular meeting room terminal 90 in which an error has occurred and performs work of causing the meeting room terminal 90 to recover from the error.

As described heretofore, the meeting room terminal 90 transmits, to the meeting management server 30, information relating to an error, such as the connection error log, the screenshot, and the battery charge remaining, whereby the administrator can check and recognize errors that have occurred at the meeting room terminals 90 comprehensively by viewing information collected in the meeting management server 30. Thus, the administrator does not need to visit actual places where the meeting room terminals 90 are located. Further, the administrator can address an error that may cause a problem in future by checking the battery charge remaining. For example, the administrator connects the meeting room terminal 90 to the power cable before the battery charge remaining reaches 0% so that the service by the resource reservation system 100 is kept provided. In addition, the meeting room terminal 90 transmits a log and a screenshot when notifying the meeting management server 30 of the error occurrence. The detailed status of the meeting room terminal 90 recorded in the log enables the administrator to obtain information that cannot be recognized only by the error number, such as when the battery charge remaining starts to decrease.

When an error relating to the battery charge remaining occurs, the meeting room terminal 90 transmits a log and/or a screenshot to the meeting management server 30 at the appropriate timing after the detection of the error. The log and the screenshot thus transmitted can be used for an early solution. Even when an error other than the error relating to the battery charge occurs, such as an error in communication, the meeting room terminal 90 transmits the log and the screenshot at the appropriate timing after the communication interruption is resolved. Alternatively, the meeting management server 30 sends a request for the log and/or the screenshot to the meeting room terminal 90 as needed.

The burden on the meeting management server 30 can be reduced by transmitting a log or a screenshot when an error is detected or when an error is likely to occur as described above.

Figure 10:
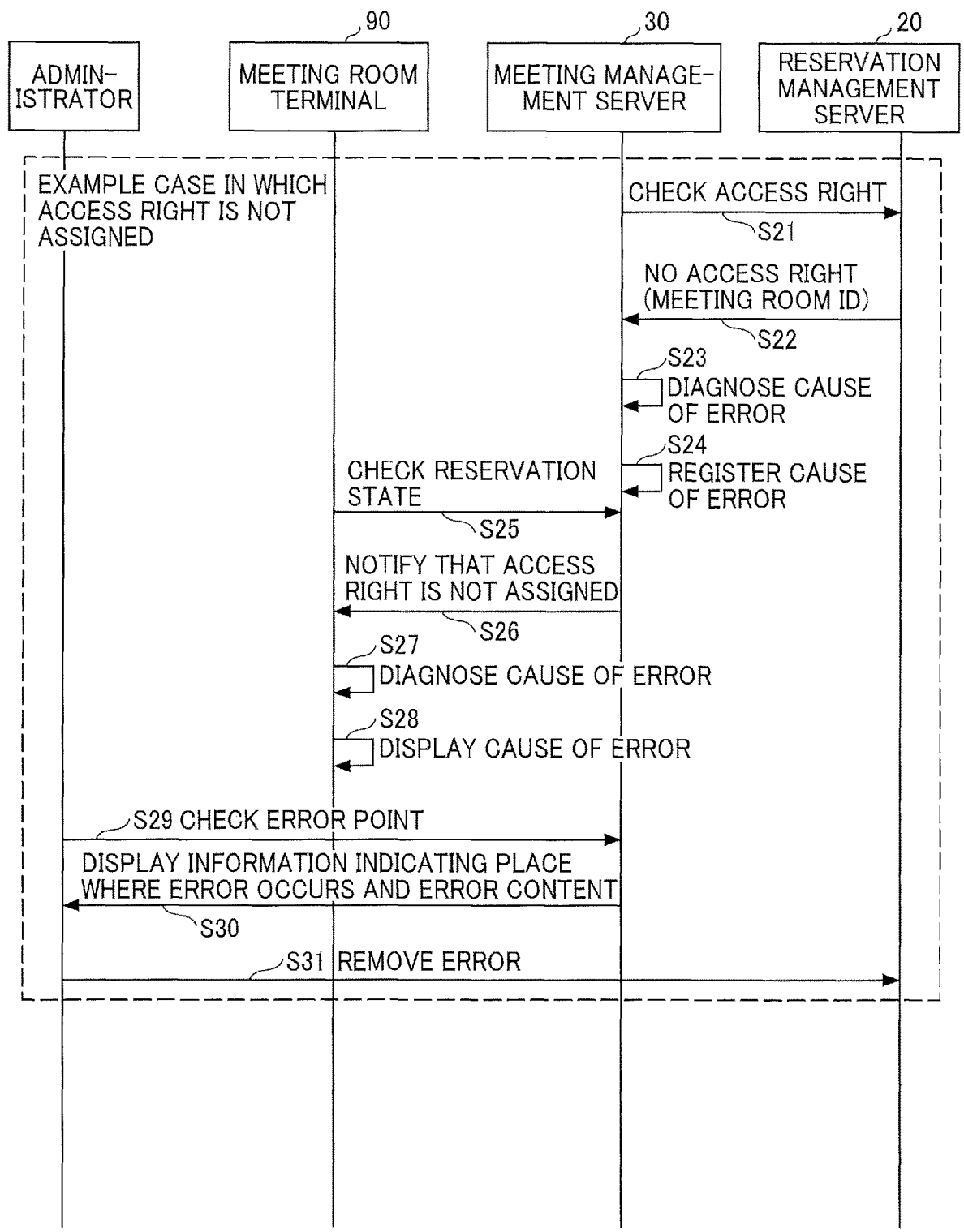
FIG. 10 is a sequence diagram illustrating an example operation performed by the resource reservation system of handling an error that has occurred at the meeting management server, according to an embodiment of the present disclosure.

Next, a description is given of an operation performed when an occurs at the meeting management server 30 with reference to FIG. 10. FIG. 10 is a sequence diagram illustrating an example operation performed by the resource reservation system 100 of handling an error that has occurred at the meeting management server 30.

S21: The reservation information obtainer 33 of the meeting management server 30 transmits a request for reservation information to the reservation management server 20 once a day, for example. At this time, logically, determination is made, for each meeting room, as to whether there is an access right.

S22: When the determination result indicates that an access right is not assigned for one or more meeting rooms, the reservation management server 20 notifies the meeting management server 30 of the meeting room(s) for which an access right is not assigned.

S23: The receiving unit 31b of the meeting management server 30 receives information indicating that no access right is assigned and the meeting room ID. The error detection unit 39 refers to the error code DB 499 and identifies a particular error number corresponding to the error type "2. There is no access right at the reservation management server".

S24: Based on the identified error number, the error management unit 41 registers, in the meeting room setting information DB 498, "error present" in the item of "no access right" in association with the meeting room ID notified from the reservation management server 20. The error management unit 41 may send an e-mail including the error type to the administrator.

S25: The reservation information request unit 98-4 of the meeting room terminal 90 periodically causes the server communication unit 91 to transmit a request for a reservation status to the meeting management server 30 together with the meeting room ID.

S26: The receiving unit 31b of the meeting management server 30 receives the request for reservation information. The reservation information transmitting unit 44 transmits the reservation information for the meeting room corresponding to the meeting room ID to the meeting room terminal 90. Even in a case where there is no access right, if there is reservation information acquired in the past, the reservation information transmitting unit 44 transmits such reservation information. If there is no reservation information, the reservation information transmitting unit 44 transmits no reservation information. Further, the error management unit 41 searches the meeting room setting information DB 498 by using the meeting room ID transmitted from the meeting room terminal 90 as a search key, to acquire an error associated with the meeting room corresponding to the meeting room ID. For example, the error notification unit 40 transmits the error number corresponding to no access right to the meeting room terminal 90.

S27: The server communication unit 91 of the meeting room terminal 90 receives the error number, and the error management unit 98 acquires the error type from the error code DB 998.

S43: The display control unit 94 of the meeting room terminal 90 displays the error number and the acquired error type (i.e., the cause of the error) on the display 616. Thus, an error that has occurred between the meeting management server 30 and the reservation management server 20 is displayed at the meeting room terminal 90.

S29: The administrator who is informed of the occurrence of an error by the e-mail or on the screen of the meeting room terminal 90 operates the registration terminal 50 to communicate with the meeting management server 30, to cause the registration terminal 50 to display the management screen 501. A detailed description is given later of the management screen 501.

S30: The management screen providing unit 42 of the meeting management server 30 transmits screen information of the management screen 501 to the registration terminal 50. The registration terminal 50 displays the management screen 501 based on the screen information received from the meeting management server 30.

S31: When the administrator finds that the error is "2. Fail to access reservation management server", the administrator operates the registration terminal 50 to communicate with the reservation management server 20, to correct the account of the meeting room at which "2. Fail to access reservation management server" has occurred. In another example, the administrator corrects the account of the meeting management server 30.

Since the error "2. Fail to access reservation management server" occurs at each of the meeting room terminals 90, only the meeting room terminal 90 located in the meeting room that is identified by the meeting management server 20 as a meeting room for which no access right is assigned displays the error.

Figure 11B:
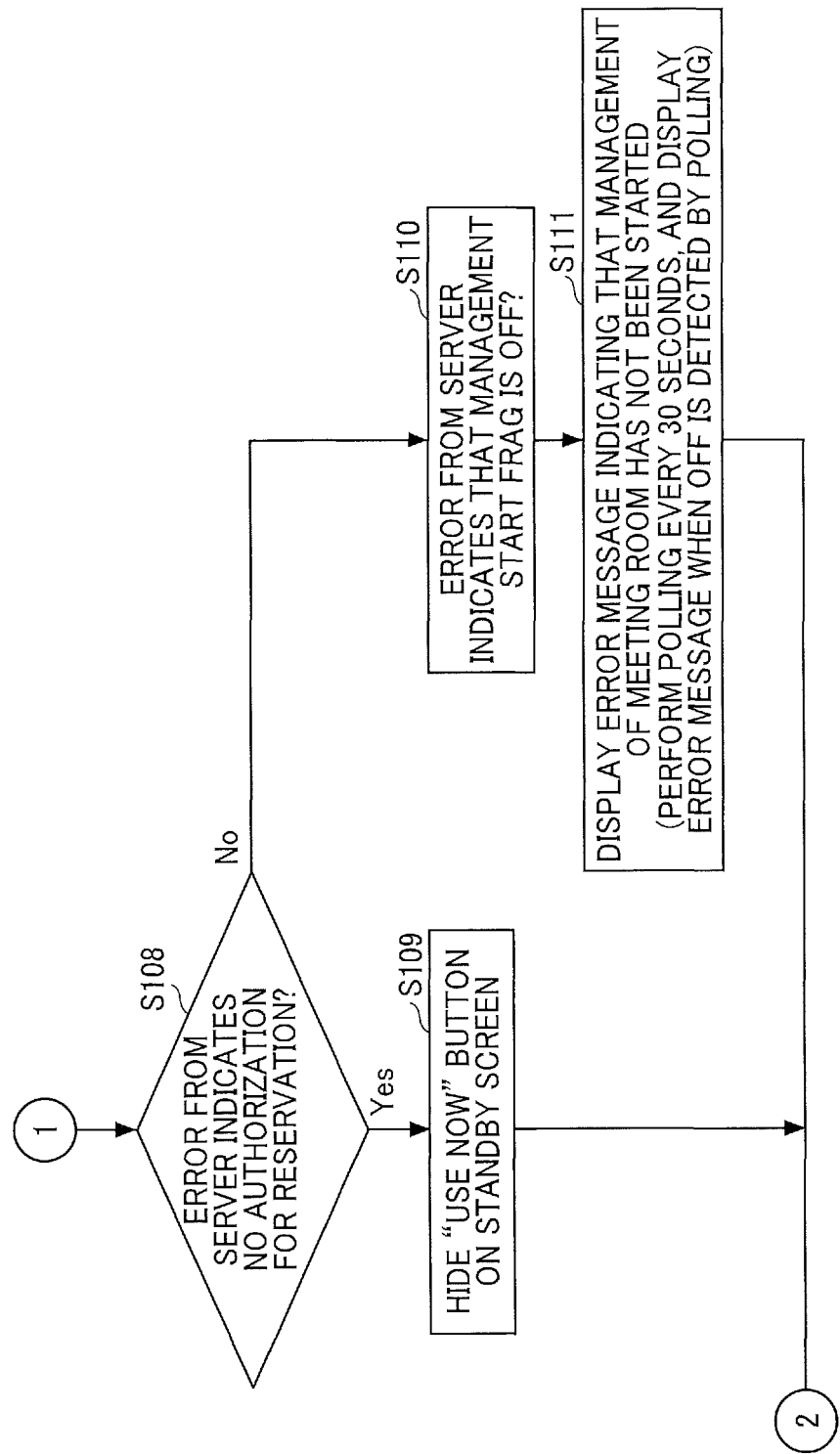

Operation Performed by Meeting Room Terminal and Operation Performed by Meeting Management Server:

A description is now given of an operation performed by the meeting room terminal 90 in detail with reference to FIG. 11A and FIG. 11B. FIGS. 11A and 11B are flowcharts illustrating an example operation performed by the meeting room terminal 90 of handling an error. The operation of FIG. 11A and FIG. 11B starts when any error is detected including an error notification from the meeting management server 30.

First, the error management unit 98 determines whether the error indicates that the battery charge remaining is less than the threshold such as 80% (S101).

When the determination result in step S101 is Yes, the error notification unit 97 transmits an error number, a screenshot, and a log to the meeting management server 30 together with the meeting room ID (S102). The display control unit 94 displays the error type and the error number acquired from the error code DB 998 on the display 616.

When the determination result in step S101 is No, the error management unit 98 determines whether the error is one of the errors "1. Wi-Fi is off", "2. Not connected to Wi-Fi", and "3. Fail to communicate with server" (S103).

When the determination result in step S103 is Yes, the error management unit 98 registers the error number, a log, and a screenshot in the error information DB 999. Once the communication interruption between the meeting room terminal 90 and the meeting management server 30 is resolved, the error notification unit 97 transmits the error number, the screenshot, and the log to the meeting management server 30 together with the meeting room ID (S104). It should be noted that the error notification unit 97 transmits all the error numbers, logs and screenshots accumulated during the occurrence of the error. The display control unit 94 displays the error type and the error number acquired from the error code DB 998 on the display 616. When plural errors are detected, the errors are displayed in the ascending order of the error numbers and switched over time. In another example, the errors displayed on the display 616 can be switched from one to another according to a user's operation.

When the determination result in step S103 is No, the error is an error notification (including the error number) from the meeting management server 30 (S105). The error management unit 98 determines whether the error notification from the meeting management server 30 is "2. Fail to access reservation management server" (S106).

When the determination result in step S106 is Yes, the display control unit 94 displays the error number and the error type acquired from the error code DB 998 on the display 616 (S107). In other word, the display control unit 94 indicates information indicating no access right. Further, the meeting room terminal 90 transmits the error number and error type to the administrator by e-mail.

When the determination result in step S106 is No, the error management unit 98 determines whether the error notification from the meeting management server 30 is "3. No authorization for reservation to reservation management server" (S108).

When the determination in step S108 is Yes, the display control unit 94 hides a "Use Now" button on the standby screen (S109). Functions other than making a reservation immediately, such as displaying reservation information, works normally. Accordingly, only the "Use Now" button is deactivated. In another example, the display control unit 94 can display a message indicating that there is no authorization for reservation. FIG. 17 illustrates an example of the standby screen on which the "Use Now" button is hided.

When the determination result in step S108 is No, the error is that management has not started (management start flag is off) (S110).

The display control unit 94 displays an error message indicating that the management of the meeting room terminal 90 has not been started (the reservation information cannot be acquired) (S111). This error is notified when it is determined that the start of management has not started in response to a request for reservation information that is sent every thirty seconds.

Figure 12B:
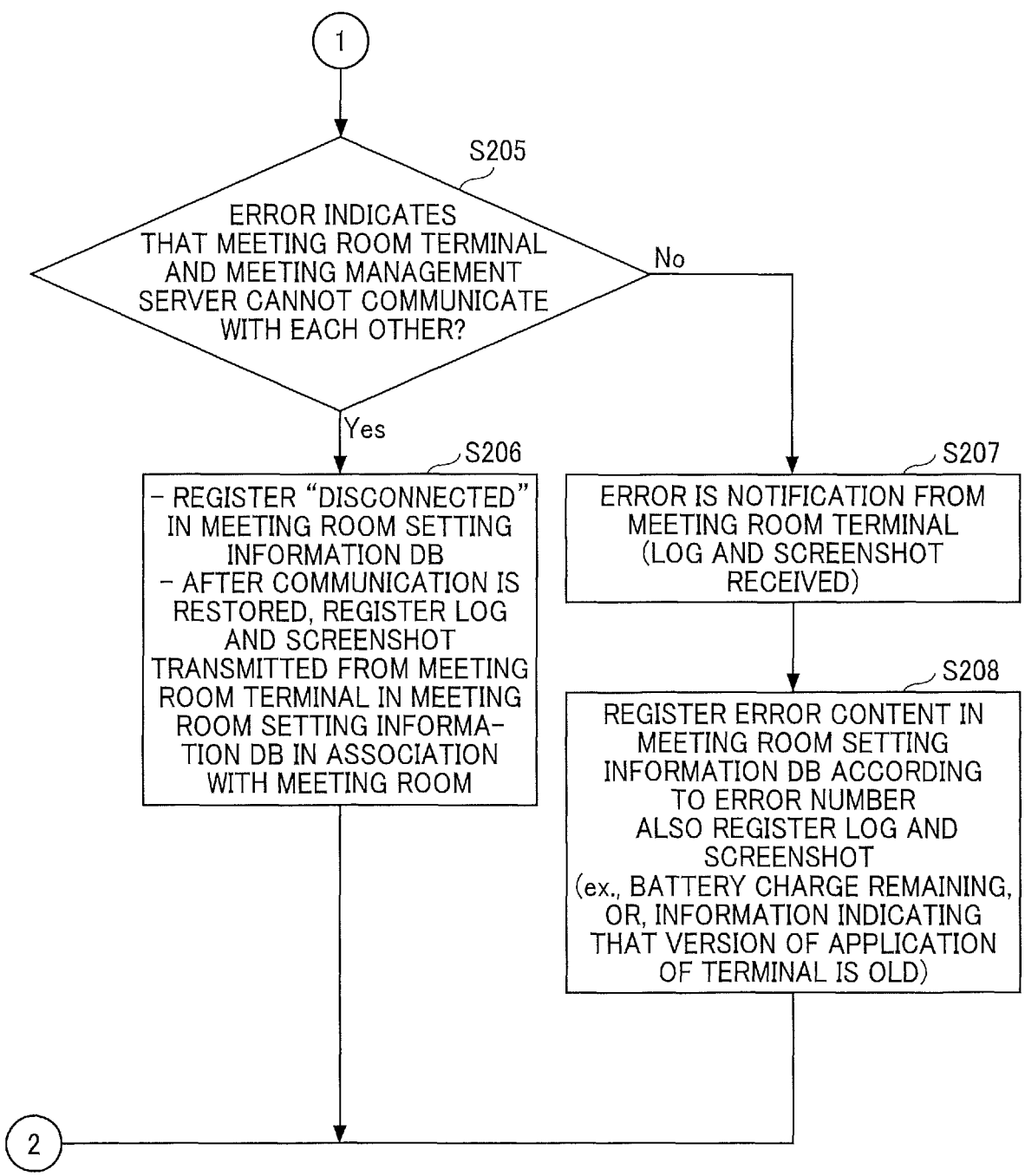

FIG. 12A and FIG. 12B are flowcharts illustrating an example of an operation performed by the meeting management server 30 of handling an error. The operation of FIG. 12A and FIG. 12B starts when any error is detected including an error notification from the meeting room terminal 90.

First, the error management unit 41 determines whether the error indicates "2. Fail to access reservation management server" or "3. No authorization for reservation to reservation management server" (S201).

When the determination result in step S201 is Yes, the error notification unit 40 of the meeting management server 30 transmits an error number to the meeting room terminal 90 (S202). Further, the error management unit 41 registers "error present" in the item of "no access right" or "no authorization for reservation" corresponding to the error number in association with the meeting room ID transmitted from the reservation management server 20 in the meeting room setting information DB 498.

When the determination result in step S201 is No, the error management unit 41 of the meeting management server 30 determines whether the error indicates that the management start flag is off (S203).

When the determination result in step S203 is Yes, the error notification unit 40 transmits an error number to the meeting room terminal 90 (S204).

When the determination result in step S203 is No, the error management unit 41 determines whether the error detected at the meeting management server 30 is the error "1. Fail to communicate with meeting room terminal" (S205).

When the determination result in step S205 is Yes, the error management unit 41 registers, in the meeting room setting information DB 498, "disconnected" in the item of the state of the meeting room and "error present" in the item of the serious error in association with the meeting room ID (S206). Every time a request for reservation information is received from the meeting room terminal 90, the meeting management server 30 registers the last time when the reservation information is received in association with the meeting room ID. The meeting management server 30 detects the disconnection when such last time is not updated for equal to or longer than a certain period of time. Therefore, the meeting room ID is specified. When connection interruption between the meeting room terminal 90 and the meeting management server 30 is resolved, the meeting management server stores the log and the screenshot transmitted from the meeting room terminal 90 in association with the meeting room ID in the meeting room setting information DB 498.

When the determination result in step S205 is No, the error is an error notified from the meeting room terminal 90. Accordingly, the meeting management server 30 receives an error number, a log and a screenshot (S207).

The error management unit 41 registers, in the meeting room setting information DB 498, the battery charge remaining in the item (e.g., battery) determined by the error number and the log and screenshot in association with the meeting room ID transmitted from the meeting room terminal 90 (S208). The error at this time indicates, for example, that the battery charge remaining is less than the threshold value or that the version of the terminal application 90a of the meeting room terminal 90 is old. In one example, the error notification is transmitted every time the meeting room terminal 90 detects an error. In another example, plural error notifications are transmitted collectively once a day in a case where the urgency is low.

Management Screen:

As described above, in response to detection of an error that has occurred in the meeting management server 30 and/or an error that has occurred in the meeting room terminal 90, the meeting management server 30 provides the registration terminal 50 with screen information based on which the registration terminal 50 displays the management screen 501 indicating contents of the error.

FIG. 13 illustrates an example of the management screen 501 displayed on the LCD 206 by the registration terminal 50. The administrator logs in to the meeting management server 30 from the registration terminal 50 with a login password and a user ID. Since the management screen 501 is used for various purposes other than checking errors, various items are displayed on the management screen 501 in fact. However, FIG. 13 illustrates the management screen 501 on which only items suitable for checking errors are displayed, for explanatory convenience.

On the management screen 501, includes a check mark column 502, a meeting room name column 503, a meeting room ID column 504, a connection status column 505 of the meeting room terminal 90, a battery column 506, a serious error column 507, a log column 508, and a screenshot column 509 are displayed. The contents of these column are information stored in the meeting room setting information DB 498 of Table 9. The management screen providing unit 42 generates screen information of the management screen 501 by referring to the meeting room setting information DB 498. The registration terminal 50 displays the management screen 501 based on the screen information.

The check mark column 502 corresponds to the management start flag in the meeting room setting information DB 498 of Table 9. The check mark column 502 includes a check box representing a reception button for accepting a setting indicating a request for the start of meeting room management. When a mark is put in the check box, it corresponds to the value True in the management start flag in the meeting room setting information DB 498. When a mark is not put in the check box, it corresponds to the value False in the management start flag in the meeting room setting information DB 498. Providing the check mark column 502 prevents the meeting management server 30 from starting meeting room management, particularly automatic cancellation, even after the initial settings has been configured.

"Disconnected", which is registered in the meeting room setting information DB 498 in response to detection of the error "1. Fail to communicate with the meeting room terminal" by the error detection unit 39 of the meeting management server 30 as described above with reference to Table 9, is displayed in the connection status column 505 of the meeting room terminal 90.

In the battery column 506, the value registered in the item of "battery" in the meeting room setting information DB 498 is displayed. In other words, the battery charge remaining included in the error notification transmitted from the meeting room terminal 90 indicating that the battery charge remaining is less than 80% is displayed.

In the serious error column 507, information registered in the item of "serious error" in the meeting room setting information DB 498 is displayed. In other words, in a case where the error "1. Fail to communicate with meeting room terminal" (disconnected) is detected, "Error Present" is displayed in the serious error column 507.

In the log column 508 and the screenshot column 509, an acquisition button 510 and an acquisition button 512 are displayed respectively. Each of the buttons is represented by a character string "ACQUIRE" and associated with a link. The acquisition button 510 is a button, when selected (pressed), for causing the log and screenshot obtainer 43 of the meeting management server 30 to send a request for a log to the meeting room terminal 90. The acquisition button 512 is a button, when selected (pressed), for causing the log and screenshot obtainer 43 of the meeting management server 30 to send a request for a screenshot to the meeting room terminal 90. Thus, the latest log and/or screenshot is acquired in real time.

In the log column 508 and the screenshot column 509, a display button 511 and a display button 513 are displayed respectively. The display button 511 is a button that when selected (pressed), receives the administrator's instruction for causing the registration terminal 50 to display a log stored in the meeting room setting information DB 498. The display button 513 is a button that when selected (pressed), receives the administrator's instruction for causing the registration terminal 50 to display a screenshot stored in the meeting room setting information DB 498. Thus, a log and/or a screenshot that is acquired while communication between the meeting room terminal 90 and the meeting management server 30 is not interrupted, and a log and/or a screenshot that is acquired while communication between the meeting room terminal 90 and the meeting management server 30 is interrupted and transmitted once the communication interruption is resolved are displayed.

Further, when "error present" is registered in each of the items of "no access right" and "no authorization for reservation" in the meeting room setting information DB 498, the character strings of the meeting room names in the meeting room name column 503 are displayed in different color from a color of the character string of the meeting room for which no error relating to the access right and the authorization for reservation is detected. For example, the meeting room terminal 90 provided in the meeting room for which "error present" is registered in the item of "no access right" fails to acquire reservation information of the meeting room and to display the reservation information on the standby screen. In other words, an error to be handled urgently has occurred in such meeting room. The management screen providing unit 42 generates screen information based on which the meeting room name (Meeting room D in FIG. 13) is displayed in red, for example. On the other hand, the meeting room terminal 90 provided in the meeting room for which "error present" is registered in the item of "no authorization for reservation" still displays the standby screen, although the "Use Now" button is hided whereby the user cannot make a reservation immediately. The urgency of such error is not so high, and therefore it is enough to give a warning. The management screen providing unit 42 generates screen information based on which the meeting room name (Meeting room E in FIG. 13) is displayed in blue, for example. The red and blue colors are just examples, and the meeting room name can be displayed in any suitable color other than red and blue.

Thus, the administrator can recognize the meeting room(s) in which an error has occurred only by viewing the meeting room name. Further, the meeting room name displayed in red or blue also functions as a details display button 514, with which a link is associated. When the administrator presses the meeting room name displayed in red or blue (i.e., presses the details display button 514), the operation reception unit 52 of the registration terminal 50 accepts the pressing. In response to the reception of the pressing of the details display button 514, the management screen providing unit 42 provides screen information of an error details screen 530 illustrated in FIG. 14.

Figure 14:
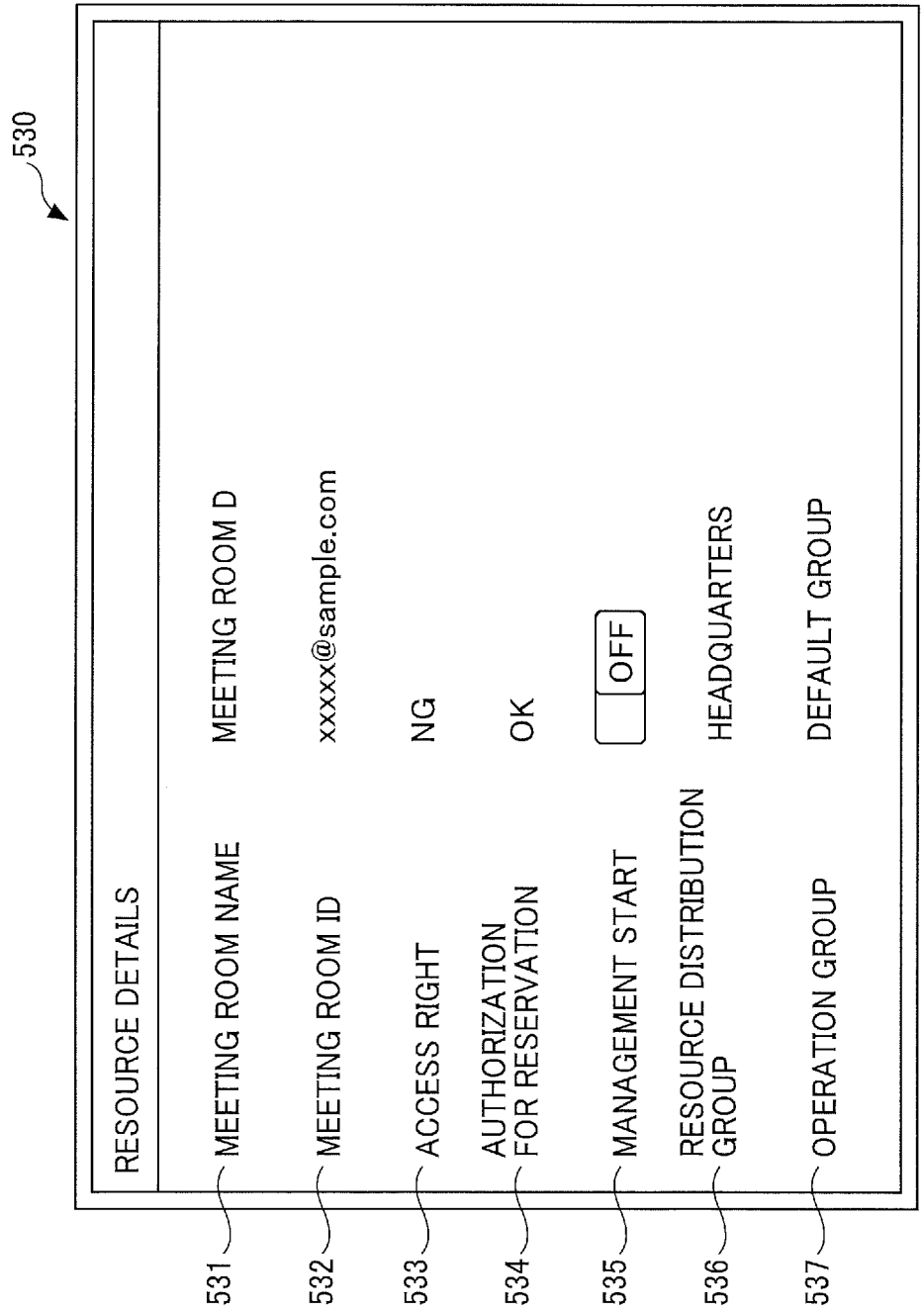
FIG. 14 is a diagram illustrating an example of an error details screen displayed by the registration terminal when a details display button is pressed on the management screen, according to an embodiment of the present disclosure.

FIG. 14 illustrates an example of the error details screen 530 displayed by the registration terminal 50 when the details display button 514 is pressed on the management screen 501. On the error details screen 530, a meeting room name 531, a meeting room ID 532, an access right 533, an authorization for reservation 534, a management start 535, a resource distribution group 536, and an operation group 537 are displayed. The meeting room name 531, the meeting room ID 532, the access right 533, and the authorization for reservation 534 are information registered in the meeting room setting information DB 498. The management start 535 corresponds to on and off of the management start flag. The resource distribution group 536 is a management group for a plurality of meeting rooms. The operation group 537 is a group that defines an operation policy.

The administrator viewing the error details screen 530 can recognize what kind of error has occurred in the meeting room indicated by the meeting room name displayed in red or blue.

Example of Screenshot

Figure 15:
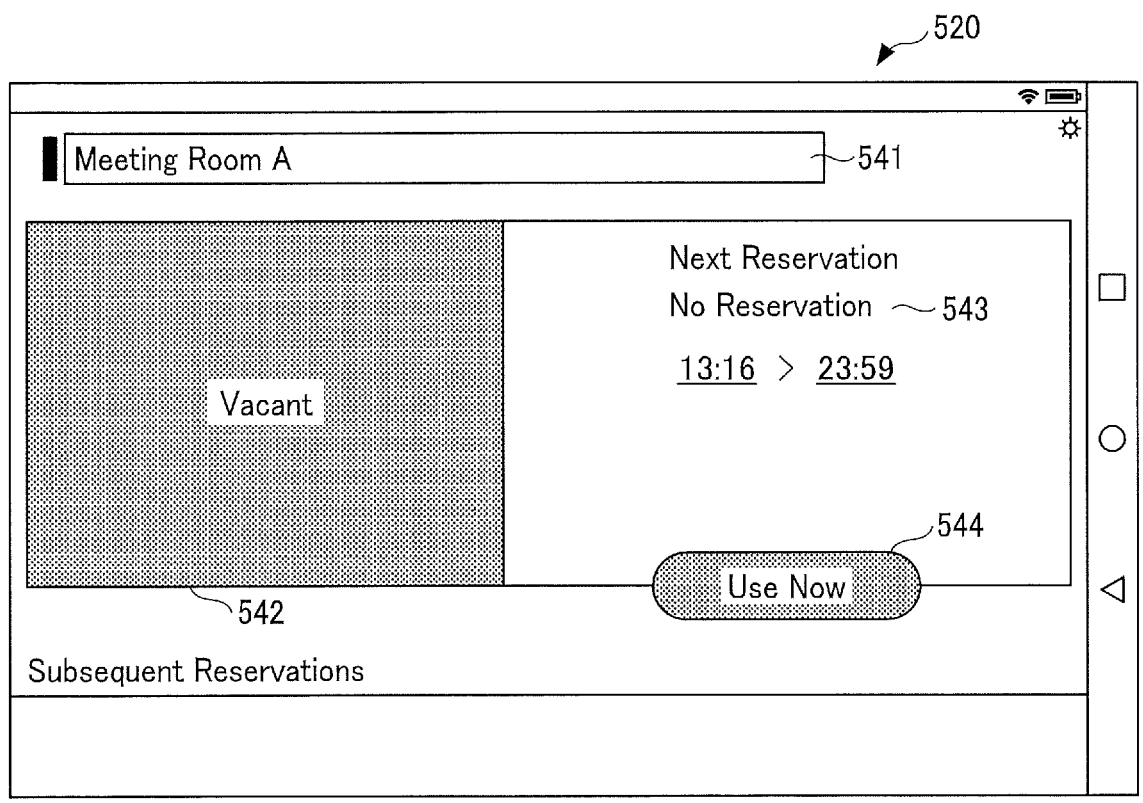
FIG. 15 is a diagram illustrating an example of a screenshot when no error has occurred, according to an embodiment of the present disclosure.

FIG. 15 illustrates an example of a screenshot 520 acquired by the meeting room terminal 90 when no error has occurred. Since the meeting room terminal 90 always displays a standby screen, FIG. 15 illustrates a normal standby screen. On this standby screen (i.e., an image represented by image data obtained by screenshotting the standby), at least a meeting room name 541, a meeting room status 542, a reservation status 543, and a use now button 544 are displayed. The meeting room name 541, the meeting room status 542, and the reservation status 543 are included in the reservation information acquired by the meeting room terminal 90 from the meeting management server 30. The use now button 544 is a button that allows a user who has not made a reservation for the meeting room to make a reservation for the meeting room from the meeting room terminal 90, whereby allowing the user to use the meeting room immediately. When the use now button 544 is pressed, the meeting room ID is transmitted to the reservation management server 20 via the meeting room terminal 90 and the meeting management server 30, and reservation information such as thirty minutes from the current time is registered in the reservation management server 20. The use now button 544 is an example of a display component for registering information.

FIG. 16 illustrates an example of a screenshot when an error has occurred. The screenshot includes an error output 540 displayed by the display control unit 94 of the meeting room terminal 90. In the error output 540, an error type 551 "Wi-Fi setting is off. Please check the terminal settings." and an error number 552 are displayed. The administrator recognizes the gist of error contents at a glance from this screenshot.

The screenshot further includes a battery icon 553 and a wireless signal status icon 554. The administrator recognizes the battery charge remaining, the status of Wi-Fi, etc. at a glance from this screenshot.

Example of Standby Screen:

When the meeting room terminal 90 is notified of an error from the meeting management server 30 that there is no authorization for reservation to the reservation management server 20, the display control unit 94 of the meeting room terminal 90 hides the use now button 544 or displays the use now button 544 with lower brightness, for example, so that a user cannot press the use now button 544.

FIG. 17 illustrates an example of a standby screen 550, on which the use now button 544 is displayed in a manner so that the button is unselectable. FIG. 17 illustrates an example in which the use now button 544 is hided, whereby a user cannot press the use button now 544. Therefore, the user is prevented from pressing the use now button 544 in a situation where reservation of the meeting room is not available due to lack of authorization for reservation.

As described heretofore, since the resource reservation system 100 of the present embodiment displays a list of errors detected at the meeting room terminal 90 and the meeting management server 30, an administrator can identify at an early state a particular meeting room terminal 90 in which an error is occurring.

Conventionally, the administrator needs to visit the meeting rooms one by one to find out a particular meeting room terminal 90 in which an error is occurring. Further, even when an error is occurring in the meeting management server 30, the administrator is able to identify at an early stage which meeting room is a target of the error occurring in the meeting management server 30.

Variations:

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The description given above is of an example in which the registration terminal 50 displays the management screen 501. In another example, a display connected to the meeting management server 30 displays the management screen 501. A terminal that displays the management screen 501 is not limited to the registration terminal 50.

The description given above is of an example embodiment in which the reservation management server 20 is an example of an external system. However, the reservation management server 20 is just an example of an external system for which the meeting management server 30 does not have an access right. The external system can be any suitable external system, provided that such external system is required for providing a service by the meeting management server 30. In another example, an error relating to the chat server 10 is displayed.

In addition, the resource reservation system 100 can include a plurality of meeting management servers 30. The meeting management server 30 can be configured as a plurality of servers to which divided functions are arbitrary allocated. The reservation management server 20 and the meeting management server 30 can be implemented by a single entity.

The resource reservation system 100 of the present embodiment can also be referred to as a "web service". The web service refers to various services provided by the Internet-related technologies. Examples of the web service include various rental services such as a meeting room rental service. A system that uses the service is called a usage system.

In addition, the functional configuration of the resource reservation system 100 are divided into the functional blocks as illustrated in FIG. 6 and FIG. 7, for example, based on main functions thereof, in order to facilitate understanding the processes performed by the resource reservation system 100. No limitation is intended by how the processes are divided or by the name of the processes. The resource reservation system 100 can also be divided into the larger number of units according to the processing contents. Further, one process can be divided to include the larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The error detection unit 96 is an example of first error detecting means. The error notification unit 97 is an example of first error notifying means. The error detection unit 39 is an example of second error detecting means. The management screen providing unit 42 is an example of information providing means. The display control unit 94 is an example of first display processing means. The screenshot acquisition unit 98-2 and the log acquisition unit 98-3 are examples of acquiring means. The error notification unit 40 is an example of second error notifying means. The operation reception unit 52 is an example of a receiver. The log and screenshot obtainer 43 is an example of information acquisition requesting means. The display 616 is an example of a second display. The LCD 206 is an example of a first display.

According to an error notification method of the related art, in a system in which one or more information processing terminals communicate with an information processing apparatus as a communication counterpart, it is difficult to identify what error is occurring in the information processing terminal or the information processing apparatus. In other words, in a situation where it is not clear in which one of the information processing terminal or information processing apparatus an error has occurred, an administrator finds it difficult to identify what error and in which apparatus an error has occurred in the entire system including the information processing terminal or the information processing apparatus in which the error has occurred.

According to one or more embodiments of the present disclosure; an error display system is provided that identifies an information processing terminal or an information processing apparatus in which an error is occurring.

What is claimed is:

1. A display system comprising:
an information processing apparatus; and
an information processing terminal communicable with the information processing apparatus via a network,
the information processing terminal being installed with an application that when executed by one or more first processors of the information processing terminal causes the one or more first processors to:
detect an error that has occurred at the information processing terminal; and
notify the information processing apparatus of the detected error,
the information processing apparatus including one or more second processors configured to:
detect an error that has occurred at the information processing apparatus; and
enable information relating to the error detected by the one or more second processors of the information processing apparatus and the error notified from the information processing terminal to be displayed on a first display, wherein the error detected by the one or more second processors includes a type of an error not related to the information processing terminal, and wherein the type of the error not related to the information processing terminal includes that an access right to an external system is not assigned, that authorization for registering information to the external system is not assigned, or a combination thereof.

2. The display system of claim 1, wherein the error detected by the one or more first processors of the information processing terminal includes a sign of a failure detected before a use of the information processing terminal becomes hard.

3. The display system of claim 1, wherein the one or more first processors of the information processing terminal are further configured to:

detect that the information processing terminal fails to communicate with the information processing apparatus;

identify a cause why the information processing terminal fails to communicate with the information processing apparatus; and display the identified cause why the information processing terminal fails to communicate with the information processing apparatus on a second display of the information processing terminal.

4. The display system of claim 3, wherein the application when executed by the one or more first processors of the information processing terminal further causes the one or more first processors to:

acquire at least one of a log and a screenshot of an image displayed on the second display in response to detection of the error by the one or more first processors; and transmit at least one of the log and the screenshot to the information processing apparatus in response to restoration of communication between the information processing terminal and the information processing apparatus.

5. The display system of claim 1, wherein the one or more second processors of the information processing apparatus are further configured to notify the information processing terminal of the error detected by the one or more second processors, and wherein the application when executed by the one or more first processors of the information processing terminal further causes the one or more first processors to display the error notified from the information processing apparatus on a second display of the information processing terminal.

6. The display system of claim 5, wherein the error detected by the one or more second processors of the information processing apparatus is that the authorization for registering the information to the external system is not assigned, and wherein the one or more first processors of the information processing terminal are further configured not to display a display component that receives an instruction for registering information to the external system on the second display of the information processing terminal, or display the display component on the second display of the information processing terminal in a manner so that the display component is unselectable.

7. The display system of claim 5, wherein the error detected by the one or more second processors of the information processing apparatus is that a setting for starting a control of the information processing terminal is not configured yet, and wherein the one or more first processors of the information processing terminal are further configured to display information indicating that the control of the information processing terminal is not started yet on the second display of the information processing terminal.

8. The display system of claim 2, wherein wherein the error detected by the one or more first processors of the information processing terminal is that a remaining amount of battery charge of the information processing terminal is less than a threshold value, and wherein the one or more first processors of the information processing terminal are further configured to notify the information processing apparatus that the remaining amount of battery charge is less than the threshold value.

9. The display system of claim 1, wherein the one or more second processors of the information processing apparatus are further configured to:

detect that the information processing apparatus fails to communicate with the information processing terminal; and enable the error detected by the one or more second processors to be displayed on the first display.

10. The display system of claim 9, wherein the information processing terminal is associated in advance with a resource to be reserved, and wherein the one or more second processors of the information processing apparatus are further configured to enable the error notified from the information processing terminal to be displayed in association with the resource on the first display.

11. The display system of claim 10, wherein the one or more second processors of the information processing apparatus are further configured to enable at least one of a log and a screenshot relating the error that has occurred at the information processing terminal to be displayed on the first display, the at least one of the log and the screenshot being notified from the information processing terminal associated with the resource.

12. The display system of claim 10, wherein the one or more second processors of the information processing apparatus are further configured to enable a button that receives an instruction for acquiring at least one of a log and a screenshot of the information processing terminal associated with the resource to be displayed, wherein the display system further includes a receiver configured to receive a pressing of the button, and wherein the one or more second processors of the information processing apparatus are further configured to send a request for at least one of the log and the screenshot to the information processing terminal in response to accepting the pressing of the button by the receiver.

13. The display system of claim 10, wherein the one or more second processors of the information processing apparatus are further configured to enable the error detected by the one or more second processors to be displayed in association with the resource on the first display.

14. The display system of claim 13,
wherein the one or more second processors of the information processing apparatus are further configured to:
enable a name of the resource to be displayed in a different color depending on whether the one or more second processors detect that the access right to the external system is not assigned or that the authorization for registering information to the external system is not assigned.

15. The display system of claim 13,
wherein the one or more second processors of the information processing apparatus are further configured to enable a list including a remaining amount of battery charge notified from the information processing terminal and information indicating that the information processing apparatus fails to communicate with the information processing terminal to be displayed in association with the resource.

16. A method of displaying an error performed by an error display system including an information processing apparatus and an information processing terminal that is communicable with the information processing apparatus via a network, the method comprising:
by one or more first processors of the information processing terminal that operates according to instructions contained in an application installed with the information processing terminal,
detecting an error that has occurred at the information processing terminal; and
notifying the information processing apparatus of the detected error;
by one or more second processors of the information processing apparatus;
detecting an error that has occurred at the information processing apparatus; and
enabling information relating to the error detected by the one or more second processors of the information processing apparatus and the error notified from the information processing terminal to be displayed on a first display,
wherein the error detected by the one or more second processors includes a type of an error not related to the information processing terminal, and
wherein the type of the error not related to the information processing terminal includes that an access right to an external system is not assigned, that authorization for registering information to the external system is not assigned, or a combination thereof.

17. An information processing apparatus that is communicable via network with an information processing terminal configured to detect an error that has occurred at an information processing terminal, and notify the information processing apparatus of the detected error, the information processing apparatus comprising one or more processors configured to:
detect an error that has occurred at the information processing apparatus; and
enable information relating to the error detected by the one or more processors of the information processing apparatus and the error notified from the information processing terminal to be displayed on a first display,
wherein the error detected by the one or processors includes a type of an error not related to the information processing terminal, and
wherein the type of the error not related to the information processing terminal includes that an access right to an external system is not assigned, that authorization for registering information to the external system is not assigned, or a combination thereof.

\* \* \* \* \*